US006888834B1

(12) United States Patent
Wood et al.

(10) Patent No.: US 6,888,834 B1
(45) Date of Patent: May 3, 2005

(54) SYSTEM AND METHOD FOR PROVIDING WIRELESS INTERNET SERVICES

(75) Inventors: Scott M. Wood, Sebastopol, CA (US); Daniel L. Roady, Luceme, CA (US)

(73) Assignee: Keyon Communications LLC, Las Vegas, NV (US)

( * ) Notice: Subject to any disclaimer, the term of this patent is extended or adjusted under 35 U.S.C. 154(b) by 647 days.

(21) Appl. No.: 09/657,947

(22) Filed: Sep. 8, 2000

Related U.S. Application Data

(60) Provisional application No. 60/153,299, filed on Sep. 10, 1999.

(51) Int. Cl.[7] ............................................. H04L 12/28
(52) U.S. Cl. .................................. 370/395.41; 370/389
(58) Field of Search ............................. 370/310, 310.1, 370/310.2, 328, 338, 359, 386, 389, 395.1, 395.52, 410, 395.41, 352–356

(56) References Cited

U.S. PATENT DOCUMENTS 5,600,633 A * 2/1997 Jaisingh et al. ............. 370/277
5,828,666 A * 10/1998 Focsaneanu et al. ........ 370/389
5,923,655 A * 7/1999 Veschi et al. ............... 370/394
6,304,578 B1 * 10/2001 Fluss .......................... 370/413

* cited by examiner

Primary Examiner—Wellington Chin
Assistant Examiner—Brenda Pham
(74) Attorney, Agent, or Firm—Squire, Sanders & Dempsey, L.L.P.

(57) ABSTRACT

An embodiment of the present invention comprises a wireless communication network topology having a wireless head end coupled to multiple Internet Service Providers, which are in turn coupled to the Internet. In addition, the topology features a radio transceiver in a tower coupled to the wireless head end via an Ethernet switch for sending and receiving data to and from customer premise equipment, which in turn is coupled to a host computer or a network of host computers. The wireless head end may perform traffic control and forwarding operations for data received from the Network Service Providers and the host computer(s). The wireless head end may also perform security measures to ensure that only messages from valid host computers are forwarded to the Network Service Providers. The customer premise equipment can assign a private IP address range to the computer(s) and perform network address translation.

17 Claims, 25 Drawing Sheets

Receiving Frame from Customer, Method at WHE

Receiving Messages From ISP

Wireless Network System

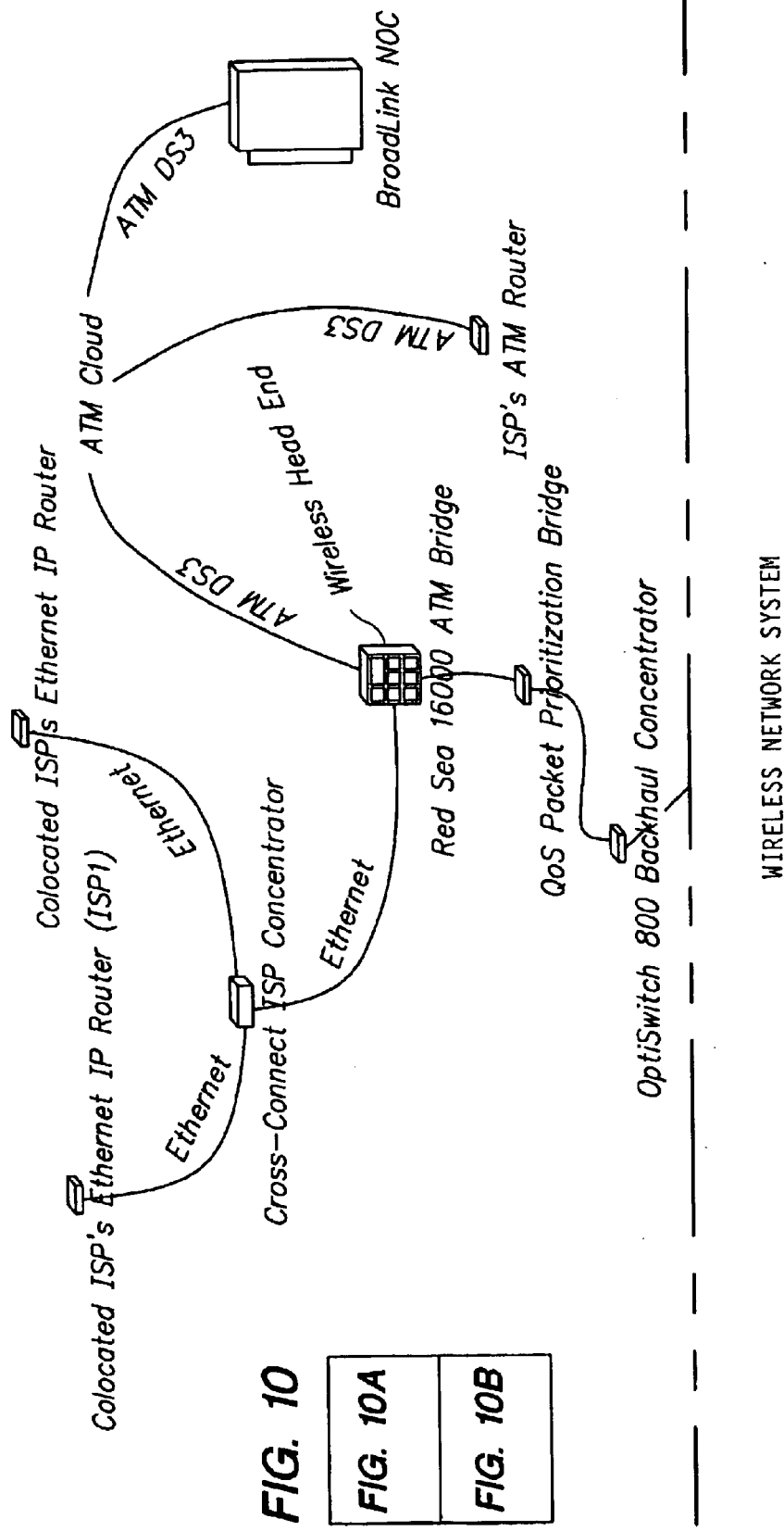

Receiving Frame from Customer,
Method at WHE

Receiving Messages
From ISP

SYSTEM AND METHOD FOR PROVIDING WIRELESS INTERNET SERVICES

PRIORITY REFERENCE TO PRIOR APPLICATIONS

This application claims benefit of and incorporates by reference provisional patent application Ser. No. 60/153,299, entitled "BroadLink Communications Wireless Router CPE," filed on Sep. 10, 1999, by inventors Wood, Roady.

BACKGROUND OF THE INVENTION

1. Field of the Invention

This invention relates generally to computer networks, and more particularly provides a system and method for using wireless routing to connect customers to internet service providers.

2. Description of the Background Art

FIG. 1 is a block diagram illustrating a prior art DSL network 100. DSL network 100 includes multiple servers 102 coupled via a computer network 104 to multiple ISPs 106. Each ISP 106 is in turn coupled via virtual customer circuits 110 to an ATM cloud 112 (e.g., AT&T, Sprint, etc.). The ATM cloud 112 is in turn coupled via virtual paths 114 to a DSL access multiplexer (DSLAM) 116 (e.g., Pacific Bell, Covad, Northpoint, etc.). The DSLAM 116 is in turn coupled via phone pairs 118 to subscribers 120.

The DSLAM 116 manages traffic between multiple ISPs 106 and multiple subscribers 120, and manages non-overlapping virtual customer circuits 110 with the ISPs 106. Although the virtual customer circuits 110 may share the same physical line, the DSLAM 116 enables traffic to be sent from each individual subscriber 120 over the virtual customer circuits 110 to the appropriate ISP 106. Similarly, the ISPs 106 can view subscribers 120 as individual virtual customer circuits 110. Every packet being sent to or from the subscriber 120 from or to the connected ISP 106 includes a virtual path identifier (VPI) and a virtual circuit identifier (VCI). A VPI/VCI pair identifies the permanent virtual circuit (PVC) over which the traffic is sent.

A message is kept secure by virtue of the network. That is, whenever a subscriber 120 transmits or receives a message, the message goes straight to the DSLAM 116. Because the phone pairs are physically separate, other subscribers 120 cannot read the message. Similarly, when the DSLAM 116 communicates upward, the messages are maintained logically separate, and thus other subscribers 120 still cannot read the message.

FIG. 2 is a block diagram illustrating an example prior art subscriber 200. Prior art subscriber 200 includes a DSL modem 202 coupling the phone pair 118 to Ethernet 204. The Ethernet 204 is coupled via an intranet to one or more computers 206. In the DSL network 100, the DSL modem 202 is referred to as the "customer premise equipment" or "CPE." It will be appreciated that, in the Ethernet-shared network, each of the computers 206 within the intranet typically receive and can read each others messages.

For example, FIG. 3 is a block diagram illustrating a prior art Ethernet-shared LAN (intranet) 300. The intranet 300 includes a single coaxial cable 302 with all these computers 1.1–1.254 connected the cable 302. Each computer has an interface card that identifies the media access control (MAC) address. When a computer 1.1–1.254 sends a message, every other computer 1.1–1.254 receives that message. Every other computer 1.1–1.254 uses the MAC address to determine whether that message was intended for it. A unicast message is addressed to a single computer. A broadcast message is addressed to all stations that are listening. Every station listens to two MAC addresses, namely, a unique dedicated MAC address and a broadcast MAC address. For example, a computer sends a broadcast message when a user goes to "Network Neighborhood." In this example, responses to the broadcast message enable the sending computer to illustrate the network 300. Although broadcast messages are inefficient, they provide an easy technique for gathering information in a shared environment.

Each intranet 300 has a range of IP addresses assigned to it and has tables that identify these addresses. In this example, the IP addresses within the intranet 300 are shown as 1.x addresses. The IP addresses outside the intranet are x.x addresses. To send a message, e.g., a unicast single address message, to another computer within the intranet 300, a computer 1.1–1.254 uses the 1.x address. To send a message outside the intranet 300, i.e., to the computer network 104, e.g., the internet, either the computer 1.1–1.254 transmits the message to the x.x address and the CPE 1.254 recognizes the x.x address as not within the intranet 300, or the sending computer 1.1–1.254 recognizes the x.x address as not within the intranet 300 and addresses the message directly to the CPE 1.254. In either case, the CPE 1.254 transmits the message to phone pair 118. It will be appreciated that, to locate the address of the CPE 1.254, the sending computer may transmit a broadcast message to locate the IP address of the CPE 1.254.

FIG. 4 is a block diagram illustrating an example prior art cable network 400. Prior art cable network 400 includes a server 102 coupled via a computer network 104 to a cable head end 402. The cable head end 402 is coupled via fiber cables 404 to subscribers 410, 412 and 414. A security concern with the cable network 400 is that, when one of the subscribers 410, 412 or 414 transmits a message, the rest of the subscribers 410, 412 and 414 receive and can read the message. A restriction of the cable network 400 is that all subscribers 410, 412 and 414 connected to the head end 402 must be connected to the same ISP, typically, the same party as the cable service provider. In the case where the cable service provider is also the ISP, the cable provider must be responsible for running the cable and for providing internet services.

In any of the networks identified above with reference to FIGS. 1–4, IP routing interconnects the different network segments. Each IP address is limited to a particular size, e.g., 32 bits. Part of the IP address identifies the network, and part of the address identifies the computer within the network. The address can be split to make few huge networks or several little ones. The first and the last IP address typically have special meanings. For example, the first address typically identifies the network access device (e.g., CPE 1.254), and the last address typically identifies a broadcast message. Although a system of fewer networks, each with a larger customer base, is more cost effective, it is often less secure. On the other hand, a system of many networks, each with a small customer base, is more secure but inefficient with address use and network management needs.

SUMMARY

An embodiment of the present invention provides a system for a data network system to securely and efficiently connect multiple ISPs to subscribers across a shared medium high-speed wireless network and delivery infrastructure. The system enables translation, filtration, identification and transmission of data from one or more computers or networks of computers to one or more than one ISP.

An embodiment of the present invention comprises a wireless communication network topology having a wireless head end coupled to multiple Internet Service Providers, which are in turn coupled to the Internet. In addition, the topology features a radio transceiver in a tower coupled to the wireless head end via an Ethernet switch for sending and receiving data to and from customer premise equipment, which in turn is coupled to a host computer or a network of host computers.

The wireless head end has a traffic control/forwarding engine for controlling, receiving and forwarding signals to and from the Network Service Providers and the Ethernet switch. The traffic control/forwarding engine maintains an ARP table and a ATM SIP table in a memory device of the wireless head end. The traffic control/forwarding engine further performs security operations to verify that signals from the host computer or computers are valid.

The customer premise equipment is coupled to the host computer or network of host computers via a Category 5 UTF Ethernet cable and includes a radio transceiver for transmitting and receiving information to and from an antenna. The customer premise equipment further includes a single board computer coupled to the host computer or the network of host computers and to the transceiver for processing data coming from or going to the Network Service Providers. The customer premise equipment is powered by a power inserter coupled to a power module, which draws power from a power source through an AC/DC converter. The customer premise equipment can assign a private range of IP addresses to the host computer(s) and can perform network address translation. Further, the customer premise equipment can operate in Layer $2^3$ mode.

Additional features, advantages, and details will be apparent from the drawings and detailed description as set forth below.

The system and method may advantageously enable wireless connections to multiple ISPs. The system and method may also enable connections to the internet without having wire running underground, in a conduit, or on a utility pole. The system and method may further enable a significantly less expensive infrastructure than wired counterparts. The system and method may still further enable flexible and efficient allocation of IP addresses to subscribers and prevent any subscriber from detecting or intercepting messages to other subscribers. The system and method may also enable ISPs to use existing off-the-shelf equipment intended to service subscribers connected via DSL to service subscribers connected via the wireless network infrastructure.

DETAILED DESCRIPTION OF THE PREFERRED EMBODIMENT

The following description is provided to enable any person skilled in the art to make and use the invention, and is provided in the context of a particular application and its requirements. Various modifications to the embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles, features and teachings disclosed.

Figure 1:
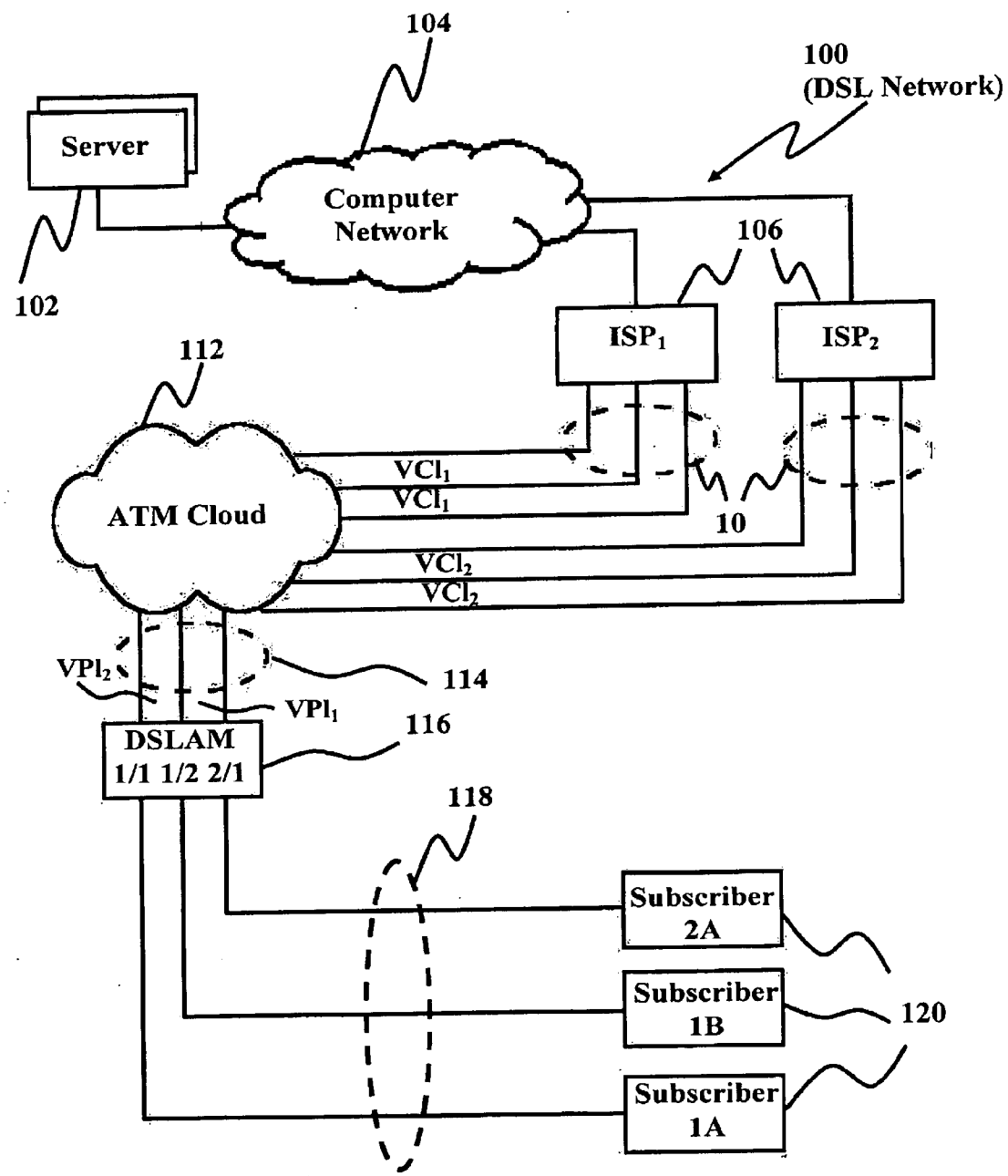
FIG. 1 is a block diagram illustrating a prior art DSL network.
Figure 2:
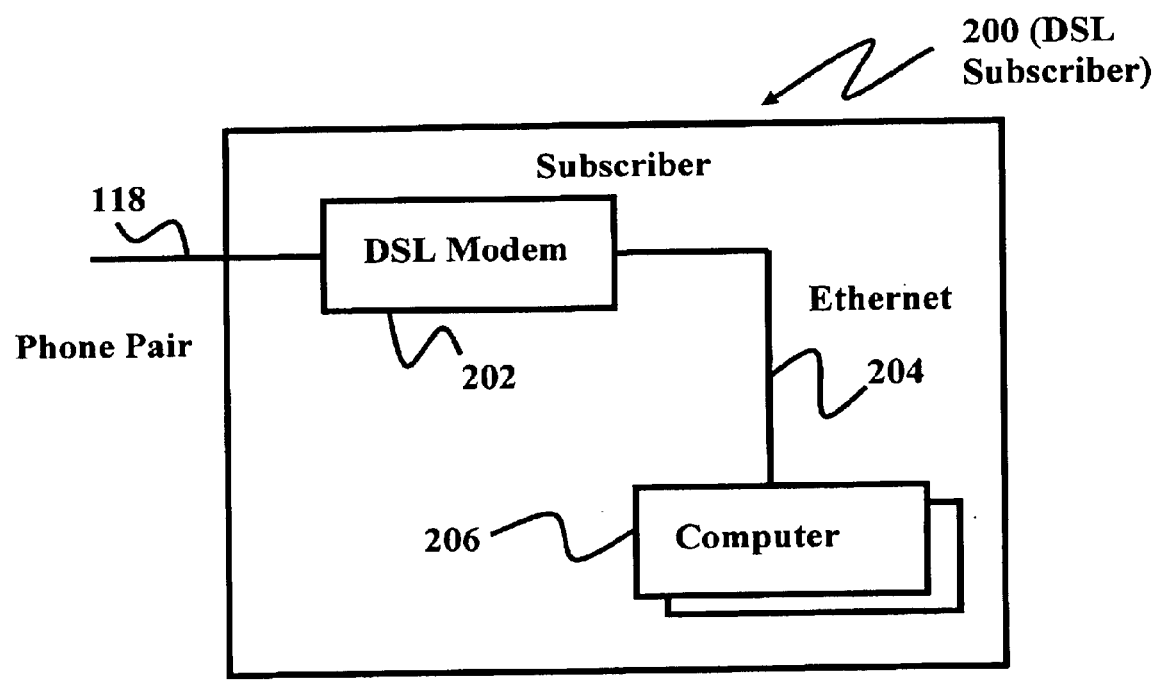
FIG. 2 is a block diagram illustrating an example prior art subscriber.
Figure 3:
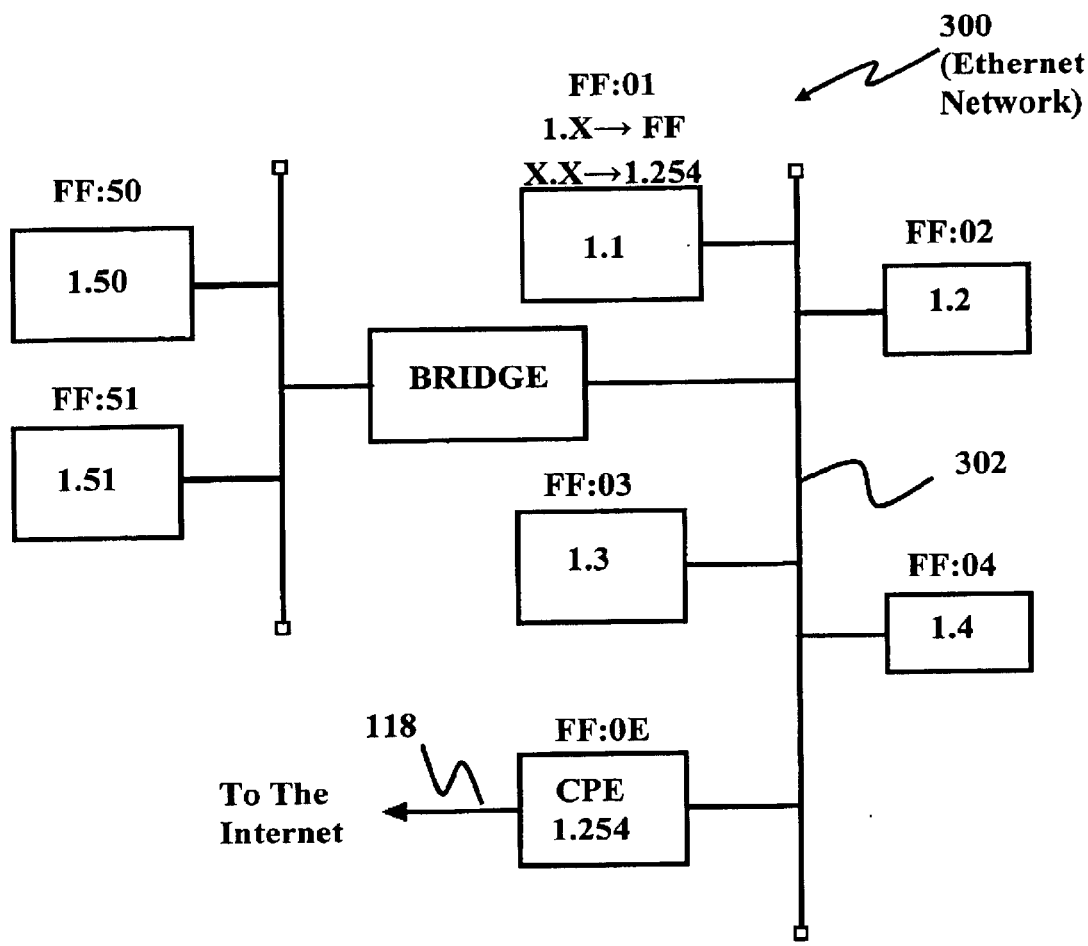
FIG. 3 is a block diagram illustrating a prior art Ethernet-shared LAN (intranet)
Figure 4:
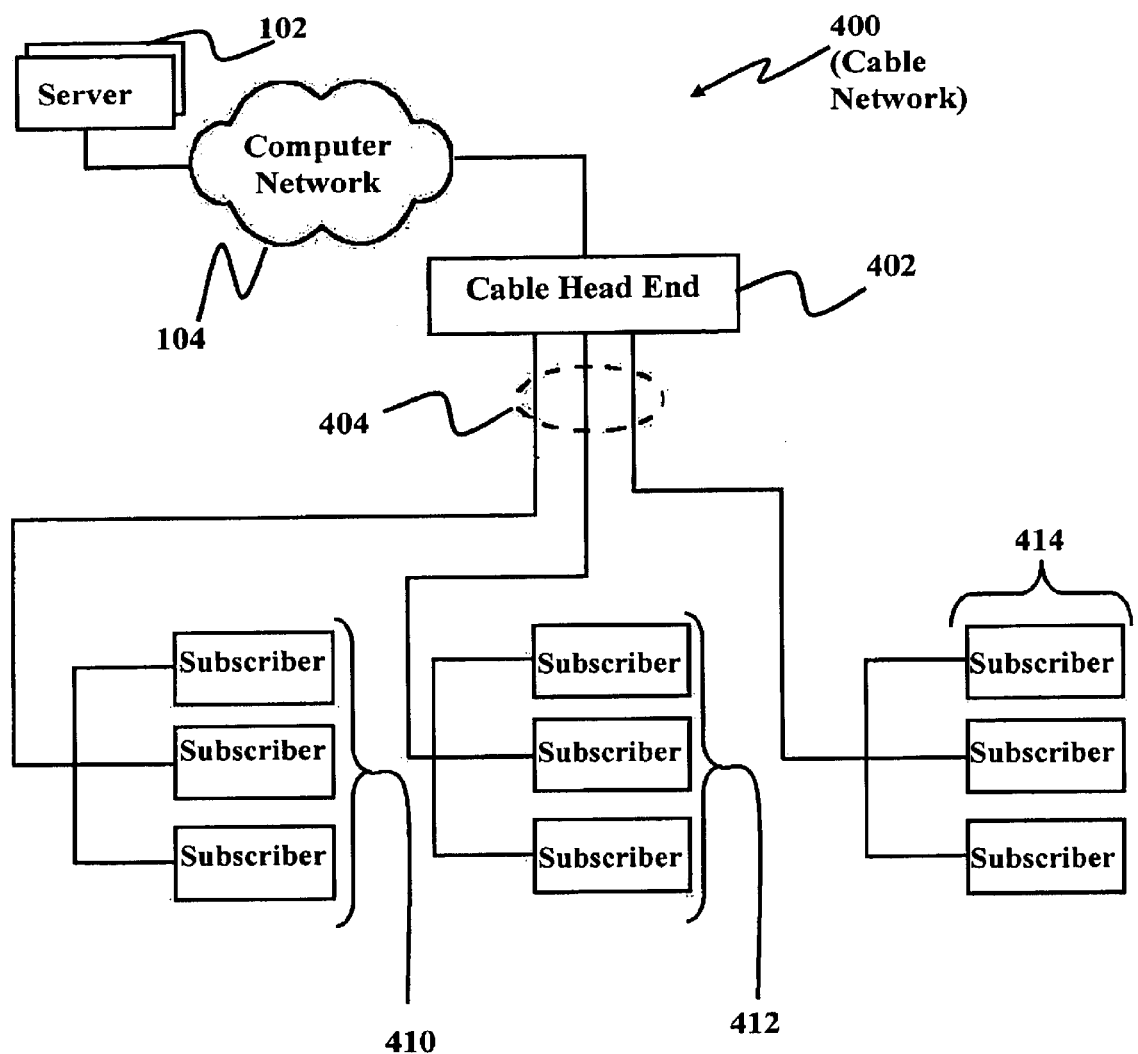
FIG. 4 is a block diagram illustrating an example prior art cable network.
Figure 5:
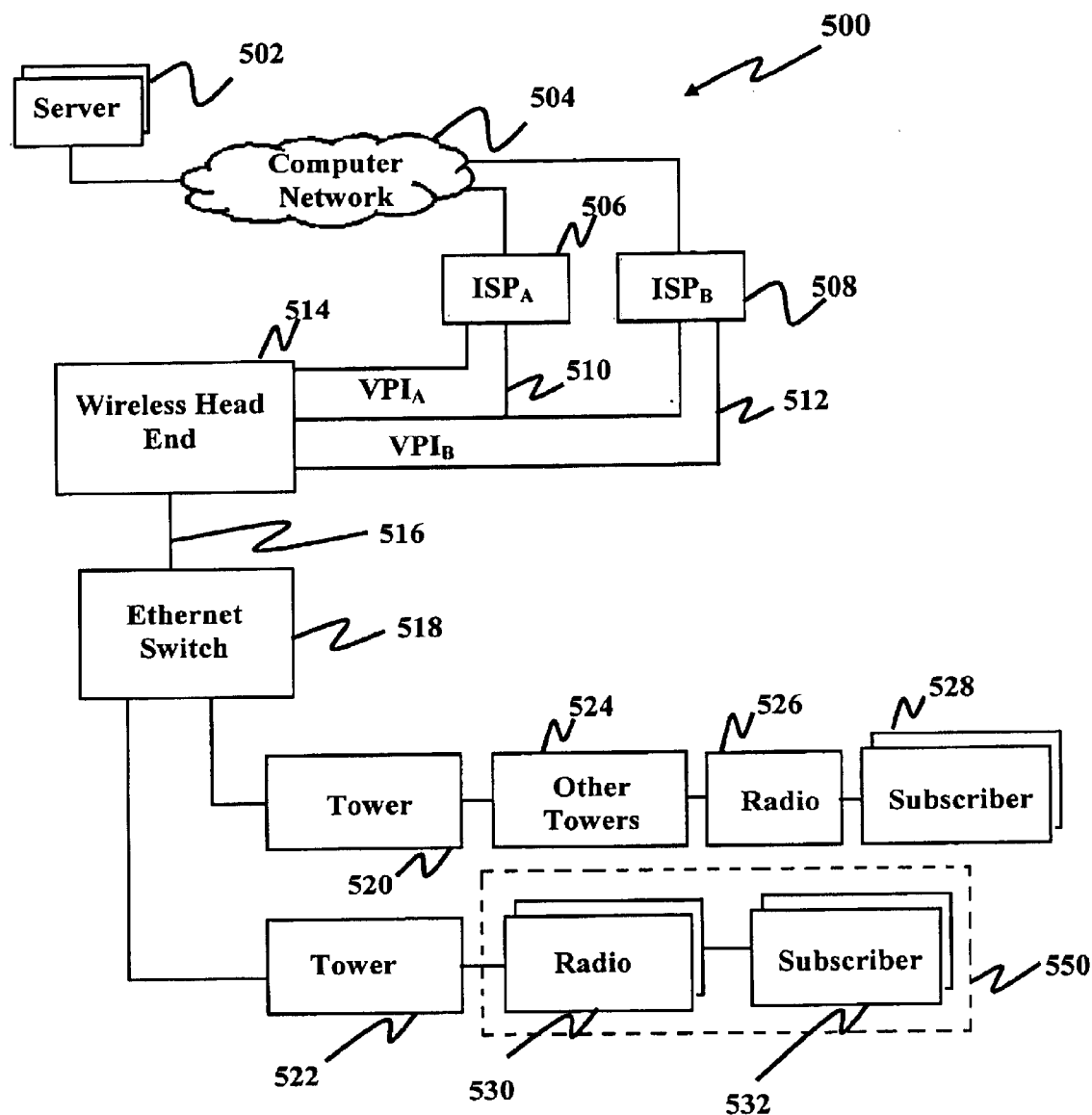
FIG. 5 is a block diagram illustrating a wireless network system in accordance with an embodiment of the present invention.

FIG. 5 is a block diagram illustrating a wireless network system 500 in accordance with an embodiment of the present invention. The wireless network system 500 includes servers 502 coupled via a computer network 504 to ISP 506 ("ISP A") and to ISP 508 ("ISP B"). ISP 506 is coupled via virtual path 510 ("VPI$_A$"), e.g., ATM or Ethernet, to wireless head end 514. ISP 508 is coupled via virtual path 512 ("VPI$_B$"), e.g., ATM or Ethernet, to the wireless head end 514. The wireless head end 514 is coupled via Ethernet 516 to an Ethernet switch 518. The Ethernet switch 518 is coupled via tower 520 and other towers 524 to radio 526. Radio 526 is coupled via an RF signal to subscribers 528. The Ethernet switch is also coupled via tower 522 to radio 530, which is in turn coupled via an RF signal to subscribers 532. One skilled in the art will recognize that, although the connection between the wireless head end 514 and the towers 520 and 522 are shown as a wired Ethernet connection, other connections, whether wired or wireless, may alternatively be used. It will be appreciated that the wireless head end 514 simulates a traditional DSLAM when connected via ATM interface.

In accordance with an embodiment of the present invention, any message received from one of the subscribers 528 or 532, whether broadcast or unicast, is only allowed to be transmitted to a "higher" node. Accordingly, the subscriber 528 or 532 transmits the message to a radio 526 or 530, which transmits the message successively to the next higher node, e.g., tower 520, 522 or 524, which transmits the message to the Ethernet switch 518. Ethernet switch 518 in turn transmits the message to the wireless head end 514, which in turn transmits the message onward to the intended recipient. Subscribers 528 or 532 cannot communicate directly with each other. Only the wireless head end 514 or an ISP router can return a message back down to the subscribers 528 or 532.

All the distribution nodes (e.g., towers, radios, etc.) record the MAC address and the originating port of a request coming from a subscriber 528, 532 and transmit that message, whether unicast or broadcast, out the port designated as its backhaul or uplink port. All backhaul or uplink ports are configured, using VLAN (virutal LAN) technology in the switches, to provide the most direct path to the wireless head-end. Accordingly, when a distribution node sees a response intended for a particular subscriber, 528, 532, i.e., with the subscriber's MAC address as the destination in the frame, the distribution node knows the port that services that subscriber and transmits it out only that port. If the subscriber's MAC address has not yet been recorded by the switch, the message is sent out all ports to ensure the subscriber will receive it. This technique provides efficient broadcast and unicast traffic control in both the upstream and downstream directions. The switches in all the distribution equipment operate only on source and destination MAC addresses and have no knowledge of the IP addresses being used.

A security concern with this approach is that if a malicious subscriber were to discover the MAC address of another subscriber, he could transmit messages with the source MAC of the unknowing subscriber and cause the switches to transmit replies to the wrong port, resulting in the malicious user denying access to and/or intercepting messages intended for the unknowing subscriber. To avoid this, the CPE to which the subscriber is connected through replaces the source MAC address of any message sent to the wireless network with its own radio's MAC address. Accordingly, if someone tries to abuse the system deliberately, for example, by getting a neighbor's station address and attempting to send out a message, the CPE would simply replace it with its own valid MAC address and prevent any attack of this nature. The CPE also stores a table of IP address to MAC address mappings, similar to ARP but learned passively for each message sent, so it knows how to rewrite the response so the appropriate subscriber's computer receives it. The above behavior is known as prior art to exist in network devices operating as routers, which is a mode the CPE can operate in. This is true as well when using Masquerading or Network Address Translation, as the device operates as a router for those functions. This behavior is not consistent with devices operating as ethernet bridges.

Figure 6:
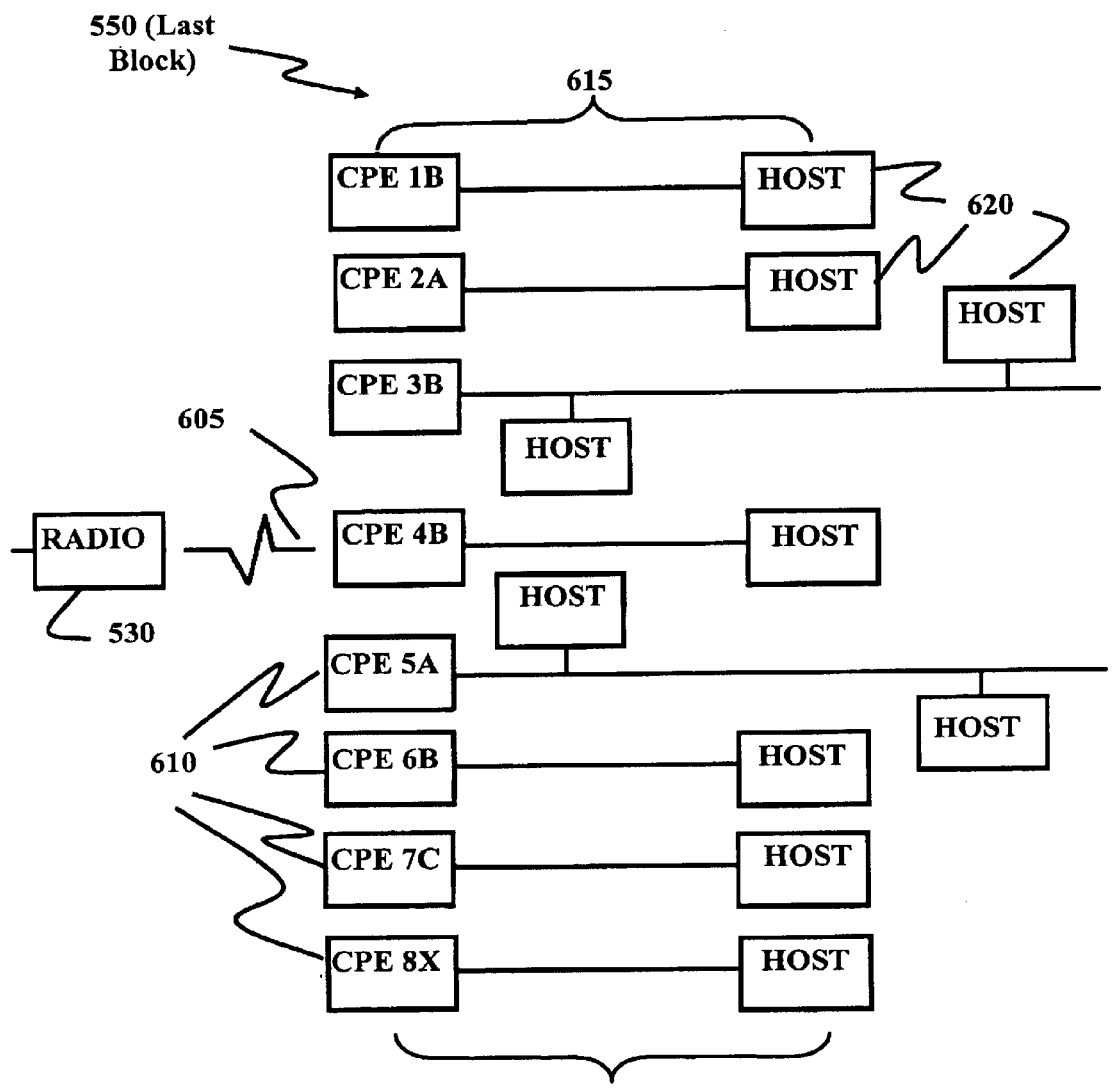
FIG. 6 is a block diagram illustrating details of a radio-to-subscriber portion of the wireless network system.

FIG. 6 is a block diagram illustrating details of a radio-to-subscriber portion (referred to herein as the "last block") 550 of the wireless network system 500. Last block 550 includes radio transceiver 530 coupled via an RF signal 605 to subscribers 532. Each subscriber 532 includes a CPE 610 coupled to an internal network (intranet) 615. The intranet 615 includes a set of hosts 620 coupled together according to an intranet topology.

As shown, subscribers 532 include CPEs 1B, 2A, 3B, 4B, 5A, 6B, 7C and 8X. For simplicity, the letter identifier identifies the ISP 506, 508 to which the CPE 610 is connected. That is, all users of CPEs 610 having the letter identifier "A" subscribe to ISPA 506, all users of CPEs 610 having the letter identifier "B" subscribe to ISPB 508, and all users of CPEs 610 having the letter identifier "X" subscribe to ISPX (not shown). Details of an example CPE 610 are described with reference to FIG. 8. Details of an example host 620 are described with reference to FIG. 15. Methods of transmitting information between the radio transceivers 530 and the subscribers 532 are described in greater detail with reference to FIGS. 11–14J.

Figure 7:
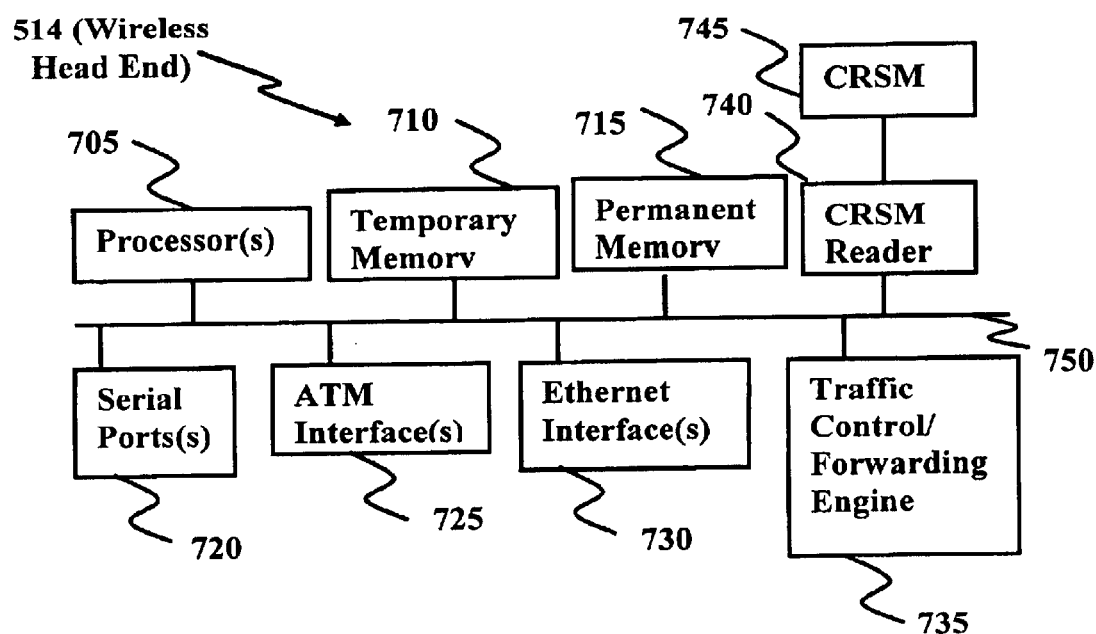
FIG. 7 is a block diagram illustrating details of the wireless head end of the wireless network system.

FIG. 7 is a block diagram illustrating details of the wireless head end 514 of the wireless network system 500. Wireless head end 514 includes a processor 705 (such as an Intel Pentium® microprocessor or a Motorola Power PC® microprocessor), temporary memory 710 (such as RAM), permanent memory 715 (such as a magnetic disk), a serial port 720, an ATM interface 725 coupled to the virtual channels 512, an Ethernet interface coupled to Ethernet 516, each coupled to the communications channel 750.

The wireless head end 514 also includes a traffic control/forwarding engine 735. The engine 735 includes software, hardware and/or firmware that receives messages (e.g., requests, data, etc.) from either the virtual paths 510 or 512 or from the Ethernet 516 and forwards the messages respectively to Ethernet 516 or to virtual paths 510 or 512. The traffic control/forwarding engine 735 maintains SIP (Source IP) and ARP tables, such as those described with reference to FIG. 11. The traffic control/forwarding engine 735 follows procedures such as those described with reference to FIGS. 12–15.

The communications channel 750 may be coupled to a computer network such as computer network 504 or the wide-area network commonly referred to as the Internet. One skilled in the art will recognize that, although the temporary memory 710 and permanent memory 715 are illustrated as separate components of the same computer, they can be portions of the same physical memory device or distributed units. The wireless head end 514 may also include additional information or components, such as network connections, additional memory, additional processors, LANs, input/output lines for transferring information across a hardware channel, the Internet or an intranet, etc. One skilled in the art will also recognize that the programs and data may be received by and stored in the system in alternative ways. For example, a computer-readable storage medium (CRSM) reader 740 such as a magnetic disk drive, hard disk drive, magneto-optical reader, CPU, etc. may be coupled to the communications channel 750 for reading a computer-readable storage medium (CRSM) 745 such as a magnetic disk, a hard disk, a magneto-optical disk, RAM, etc. Accordingly, the wireless head end 514 may receive programs and data via the CRSM reader 740. Further, it will be appreciated that the term "memory" herein is intended to cover all data storage media whether permanent or temporary.

Figure 8:
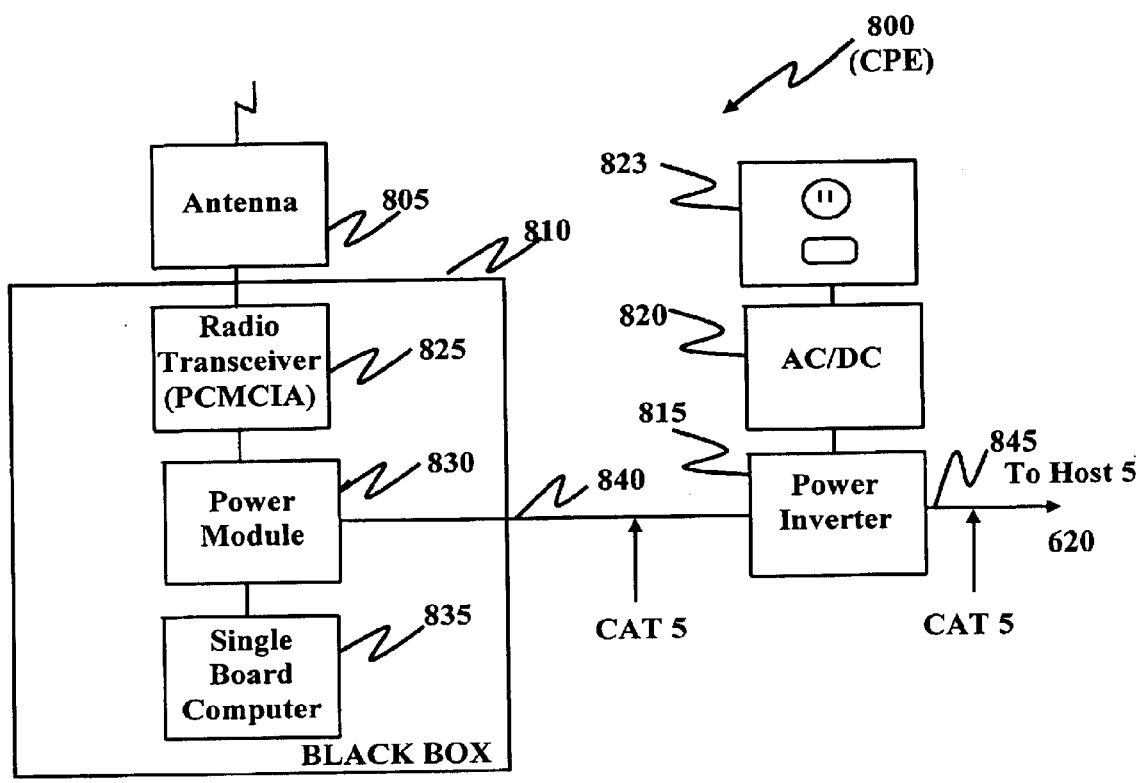
FIG. 8 is a block diagram illustrating details of a CPE of the wireless network system.

FIG. 8 is a block diagram illustrating details of a CPE 800 of the wireless network system 500. The CPE 800 includes an antenna 805, coupled to a data processing "black" box 810, which is in turn is coupled to a power inserter 815. The power inserter 815 is coupled to an AC/DC converter 820, which is coupled to a power source 823. The power inserter 815 is further coupled via CAT5 (Ethernet) to the internal hosts 620.

The black box 810 includes a radio transceiver (PCMCIA) component 825 transmits and receives information to and from the antenna 805 and to and from the hosts 620. The power module 830 is coupled via CAT5 to the power inserter 815. The black box 825 further includes single board computer 835 that processes data coming from or going to the outside network.

The power inserter 815 and power module 830 provide power to the radio transceiver 825 and to the single board computer 835. Because of the power module 830 and power inserter 815; a separate power line need not be connected. The power module 830 and power inserter 815 provide flexibility in the placement of the antenna 805, which is critical to the quality of the connection and connectability of a subscriber 532. It will be appreciated that some antenna locations may prove to be difficult to run normal power.

Signal coming in through the antenna is transmitted to the radio transceiver 825, which processes the signal into data and forwards the data to the single board computer 835. The single board computer 835 processes the data, and transmits it to the power module 830, which extracts power from the data line that it comes in. Wherever the data needs to go, the power module 830 sources the power into the data part.

In the current implementation, the single board computer 835 uses Linux's masquerading feature. The masquerading feature essentially restricts the IP addresses of internal hosts 600 to those within a private address range not Internet routable. The single board computer 835 performs IP address translation by replacing an ISP's address with its address and by replacing a host computer's addresses with its address. By using masquerading, the CPE 800 effectively hides all computers and addresses behind its address. Computers outside the internal network see only more traffic to and from this CPE's IP address (with different port numbers). As is known in the art, a port number identifies the program on the host 600 that requested that piece of information. It is well known that the use of Masquerading restricts the use of applications which transmit IP information in the data payload of an IP packet, or applications for which a remote server connects to a port on the Masqueraded client which was not previously transmitted through the Masquerading firewall.

Additionally the CPE has a hybrid bridge-router mode, dubbed Layer$2^3$, which allows bridging of certain configured IP addresses in a manner which prevents many security problems that exist using standard bridging technology on a network with multiple customer and ISP entities. In this mode, the CPE operates the customer-side ethernet interface in promiscuous mode, receiving all frames to all stations on the intranet, and determines to transmit them to the ISP using a specific combination of IP address filtering, MAC address filtering, rewriting of ARP request and reply messages, ARP request generation and ARP reply generation in accordance with the processes described in FIG. 14. Since the IP and MAC addresses of the ISP's router differ from the IP and MAC addresses assigned to the customer-side interface of the CPE, Masquerading and NAT can work simultaneously with the use of Layer$2^3$ employed by the CPE, allowing bridging of certain IP addresses and Masquerading of others.

Figure 9:
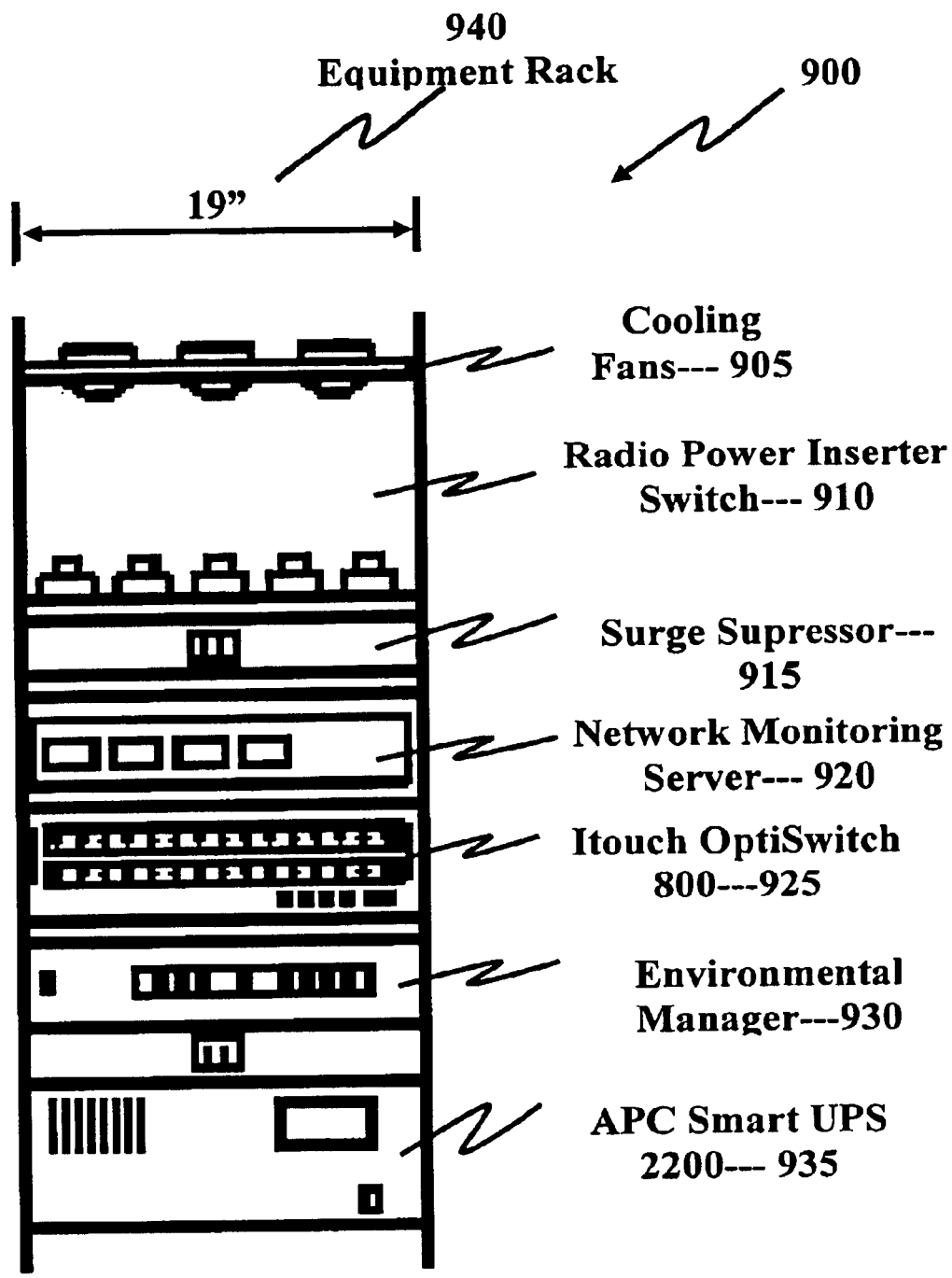
FIG. 9 is a block diagram illustrating details of a tower.

FIG. 9 is a block diagram illustrating details of a tower 900. Tower 900 includes cooling fans 905, a radio power inserter switch 910, a surge suppressor 915, a network monitoring server 920, an Itouch OptiSwitch 800 (i.e., the traffic controller portion), an environmental manager 930 and an APC SmartUPS 2200 935, mounted on an equipment rack 940.

Figure 10B:
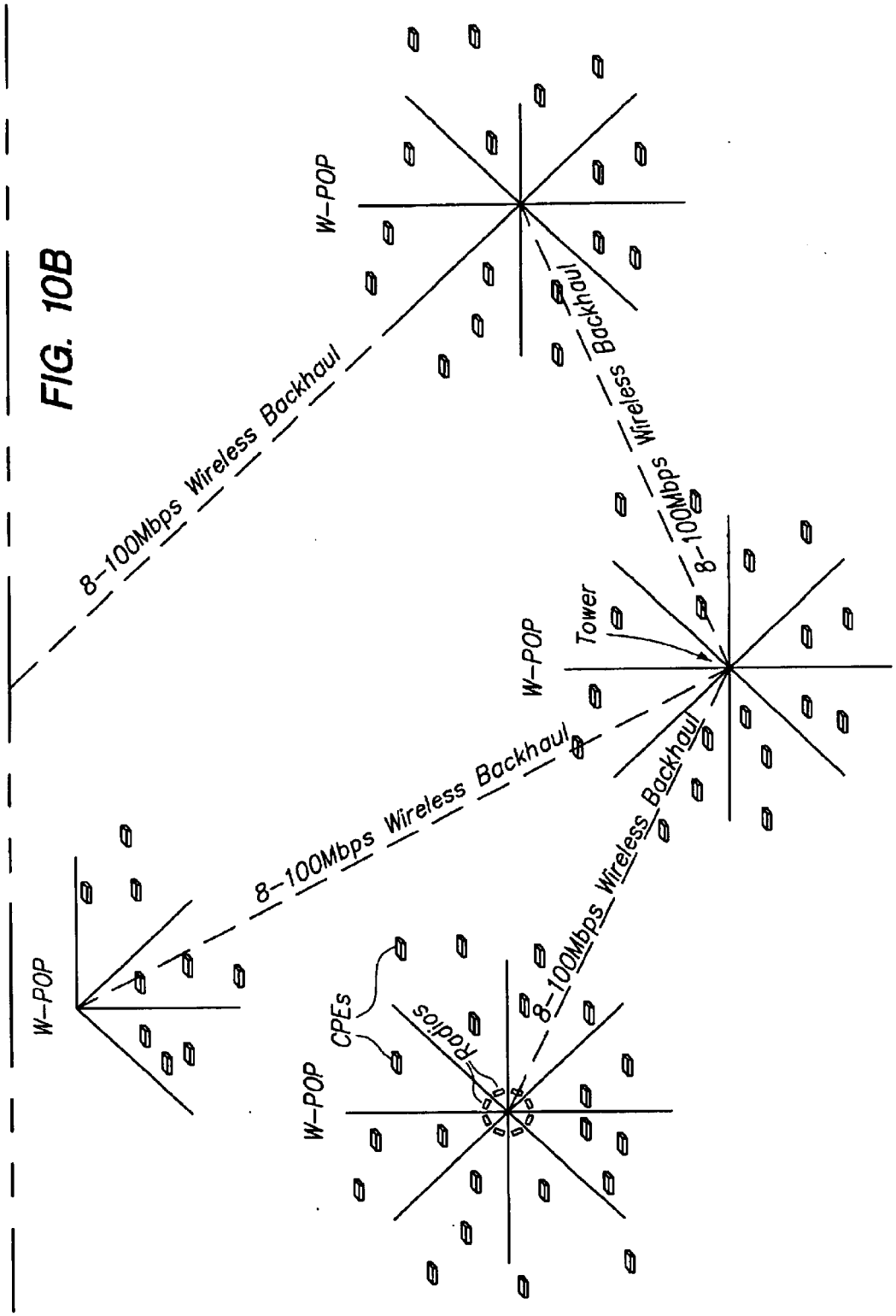
FIG. 10 is a block diagram illustrating a wireless network system in accordance with another embodiment of the present invention.

FIG. 10 is a block diagram illustrating a wireless network system 1000, in accordance with another embodiment of the present invention.

Figure 11:
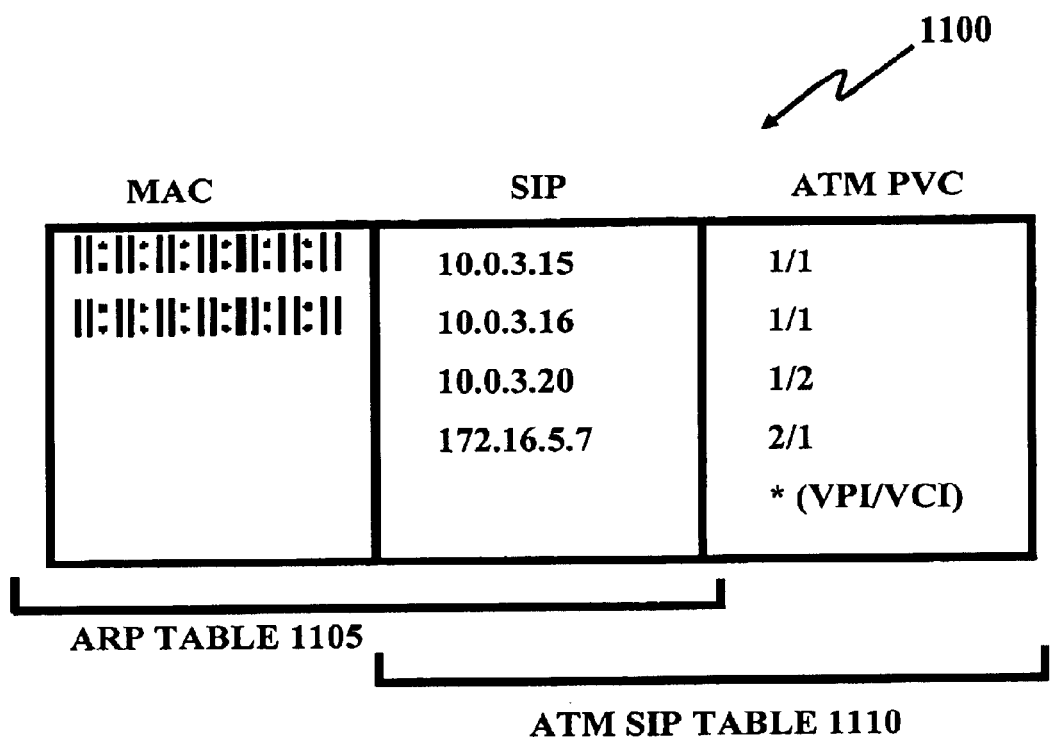
FIG. 11 is a table including a combined address resolution protocol (ARP) table identifying MAC address to IP address correspondence and an ATM source IP (SIP) table identifying IP address to ATM PVC identifier correspondence.

FIG. 11 is a combined table 1100 containing an address resolution protocol (ARP) table 1105 identifying MAC address to IP address correspondence and an ATM source IP (ATM SIP) table 1110 identifying IP address to ATM PVC identifier correspondence. For simplicity, the ARP table 1105 and ATM SIP table 1110 are being illustrated as a single table, although they typically are two independent tables.

Figure 12:
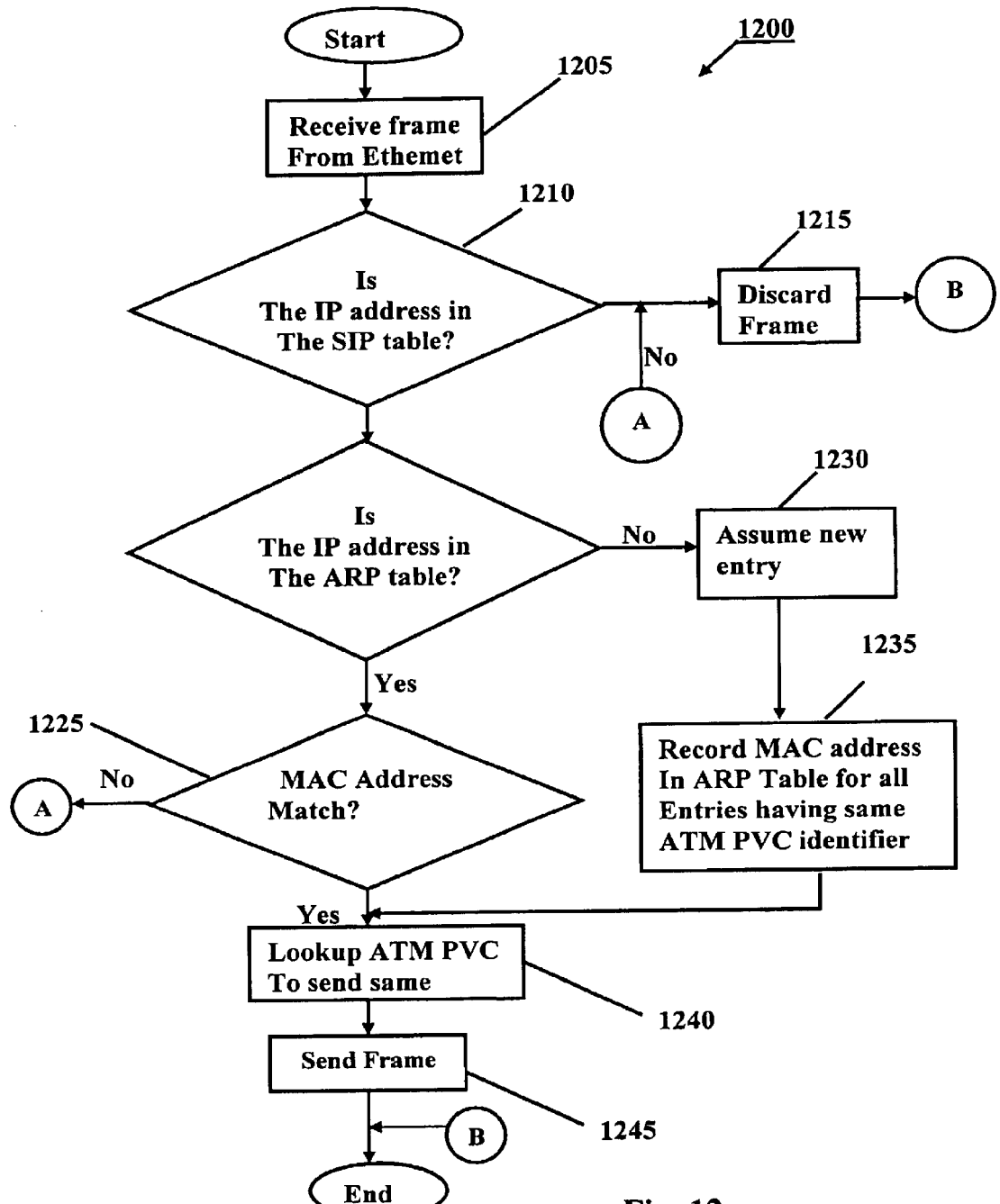
FIG. 12 is a flowchart illustrating a method of receiving a frame from a subscriber by the wireless head end.

FIG. 12 is a flowchart illustrating a method 1200 by the wireless head end 514 of handling a message (frame) received from a subscriber 528/532. Method 1200 begins with the wireless head end 415 in step 1205 receiving a frame from the Ethernet 516. The wireless head end 514 in step 1210 checks whether the IP address is in its ATM SIP table 1110. If not, then the wireless head end 514 in step 1215 discards the frame (as an invalid subscriber), and method 1200 ends. If so, then the wireless head end in step 1220 determines if the IP address is in the ARP table 1105. If not, then the wireless head end 514 in step 1230 assumes the IP address is a new entry, in step 1235 records the MAC address (i.e., whatever MAC address was used to send the message) in the ARP table for all entries having the same ATM PVC identifier in the ARM SIP table 1110, and proceeds to step 1240. The wireless head end 514 can add the MAC address for all IP addresses since the system 500 uses MAC address multiplexing (or MAC address translation), i.e., the function the CPE 610 performs by substituting its MAC address for the MAC address of the host 620. If the wireless head end 514 has the entry in the ARP table 1105, then the wireless head end 514 in step 1225 determines whether the MAC addresses match. If not, then method 1200 jumps to step 1215 to discard the frame. If so, then method 1200 proceeds to step 1240. In step 1240, the wireless head end 514 retrieves the ATM PVC identifier upon which to send the frame, and in step 1245 sends the frame to the appropriate ISP. Method 1200 then ends. An alternate embodiment could have the wireless head end learn a new source MAC address and source IP address in its ARP table every time a frame is received.

It will be appreciated that the above-described method 1200 provides fast, low overhead provisioning. The method 1200 enables adding hosts 620 (e.g., particular desktops) to the system 500 without going through a repetitive tedious manual process, especially since the CPE can automatically assign the correct IP addresses via DHCP when using the masquerading feature. More particularly, the ATM SIP table 1110 is set up in advance, preferably manually. Essentially, when a new ISP is being added, the new ISP assigns a range of IP addresses. An ATM PVC is assigned to each or several of those IP addresses, and the IP addresses and assigned ATM PVC are added to the ATM SIP table 1110. As a security measure, if there is more than one IP address associated with an ATM PVC and if a frame arrives that does not have an entry in the ARP table 1105, then the wireless head end 514 can make sure that none of the IP addresses associated with the particular ATM PVC have been used before. This is to prevent more than one subscriber or CPE from using different IP addresses assigned to the same PVC.

In the case where there is only one host 620 behind CPE 610, there should only be one IP address in the ATM SIP table 1110 mapped to an ATM PVC. In the case where there are multiple hosts 620 in an intranet behind a CPE 610, then there should be multiple IP addresses. However, since the hosts are considered the "same" customer, they should go to the same PVC.

It should also be mentioned that the system 500 enables transmission of messages from a CPE 610 to the wireless head end 514 using a predefined, most efficient path. Accordingly, the system 500 enables responsive messages to be transmitted via the same, most efficient path. Since the system 500 is built in a tree-like topology, each node (e.g., wireless head end 514, towers 520, 522, 524, radios 526, 528, subscribers 528, 532, etc.) knows which port a feed is coming in on. The intermediary nodes (e.g., towers 520, 522, 524, radios 526, 528, etc.) record, for each CPE 610, which port the message came out. Accordingly, when the intermediary nodes receive responsive messages from the wireless head end 514, each tower 520, 522, 524 has a record of the most efficient path.

The towers 520, 522, 524 (switches) are programmed to deliver all messages from CPEs 610 only to the wireless head end 514. The towers 520, 522, 524 need only know which direction CPEs 610 are and which direction the wireless head end 514 is. Similarly, any intermediary (leaf) node (e.g., tower or radio) can only originate messages to the wireless head end 514. The intermediary nodes cannot send information directly to any other nodes (e.g., towers, radios, subscribers, etc.).

Figure 13:
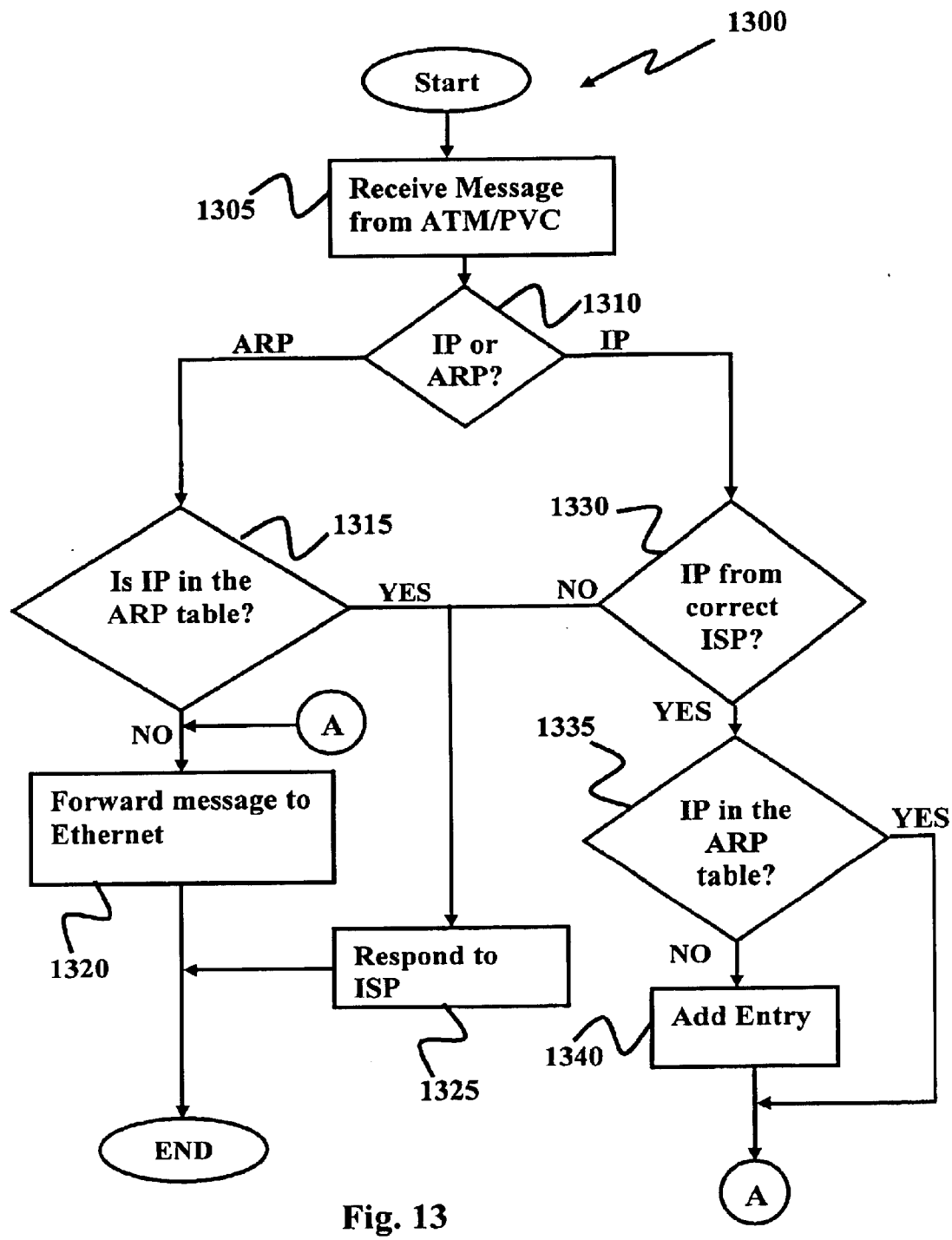
FIG. 13 is a flowchart illustrating a method of receiving a message from the ATM PVC by the wireless head end.
Figure 14A:
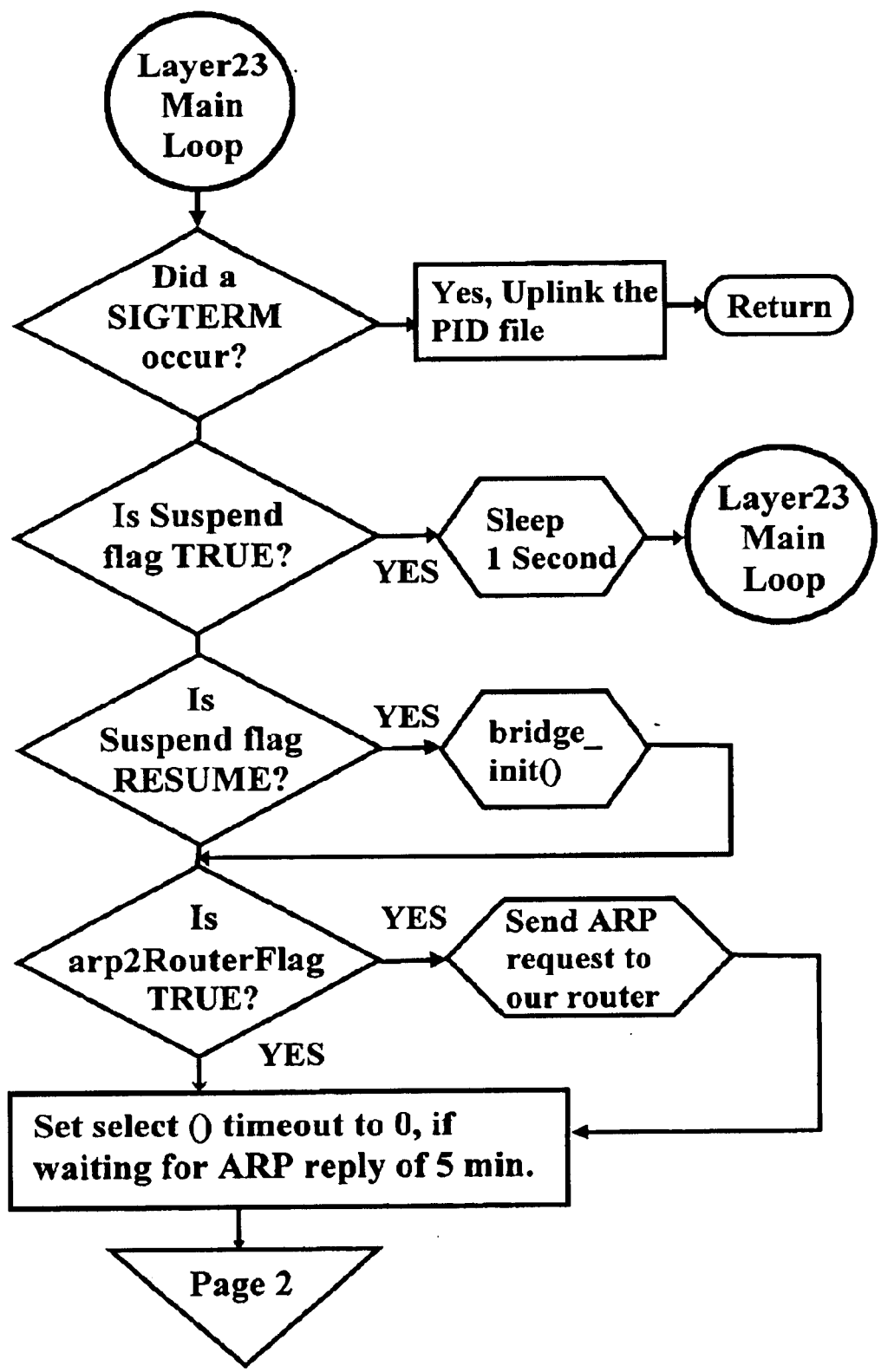
FIGS. 14A–J are a flowchart illustrating a method of processing by the single board computer of the CPE.
Figure 14B:
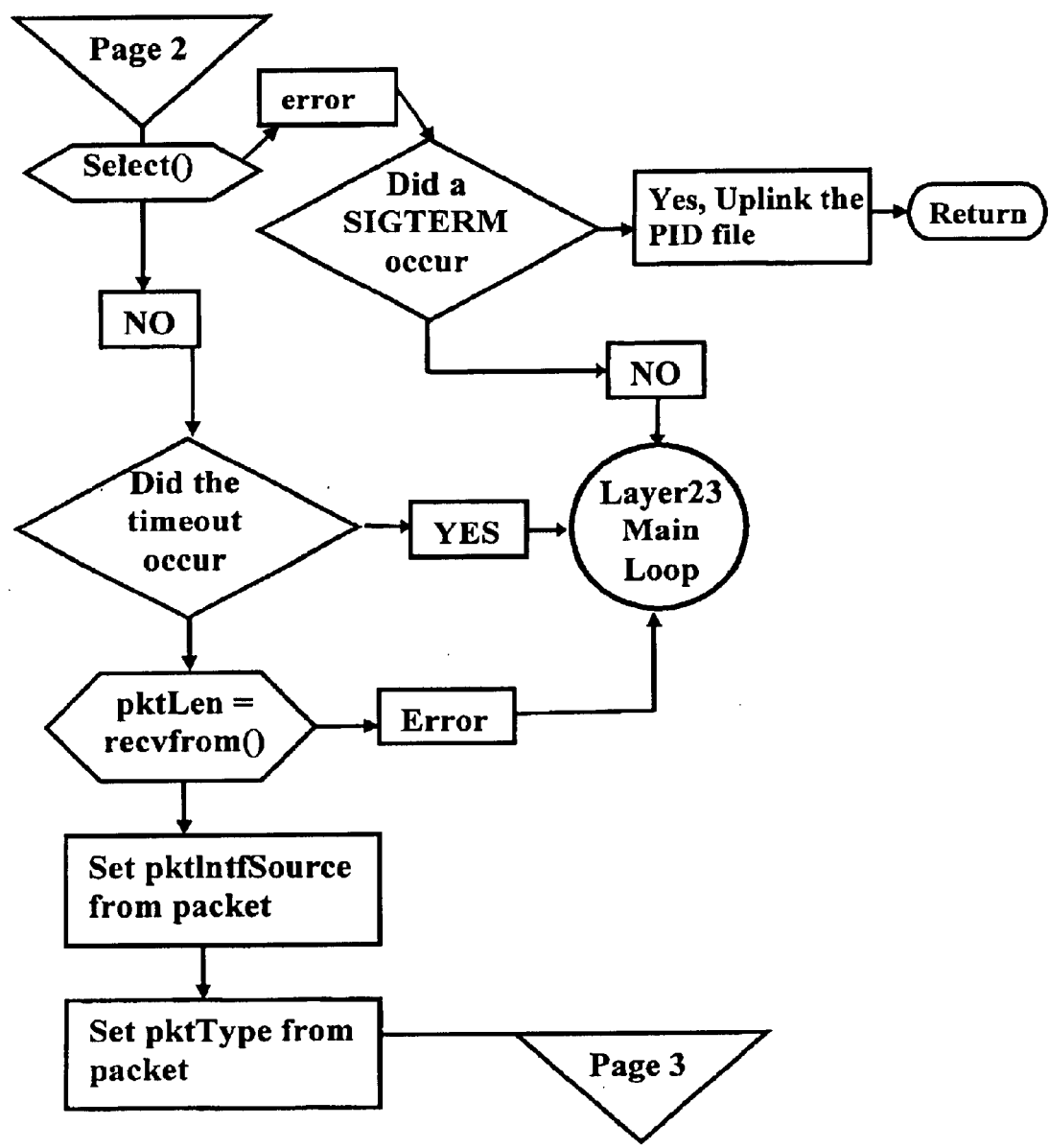
Figure 14C:
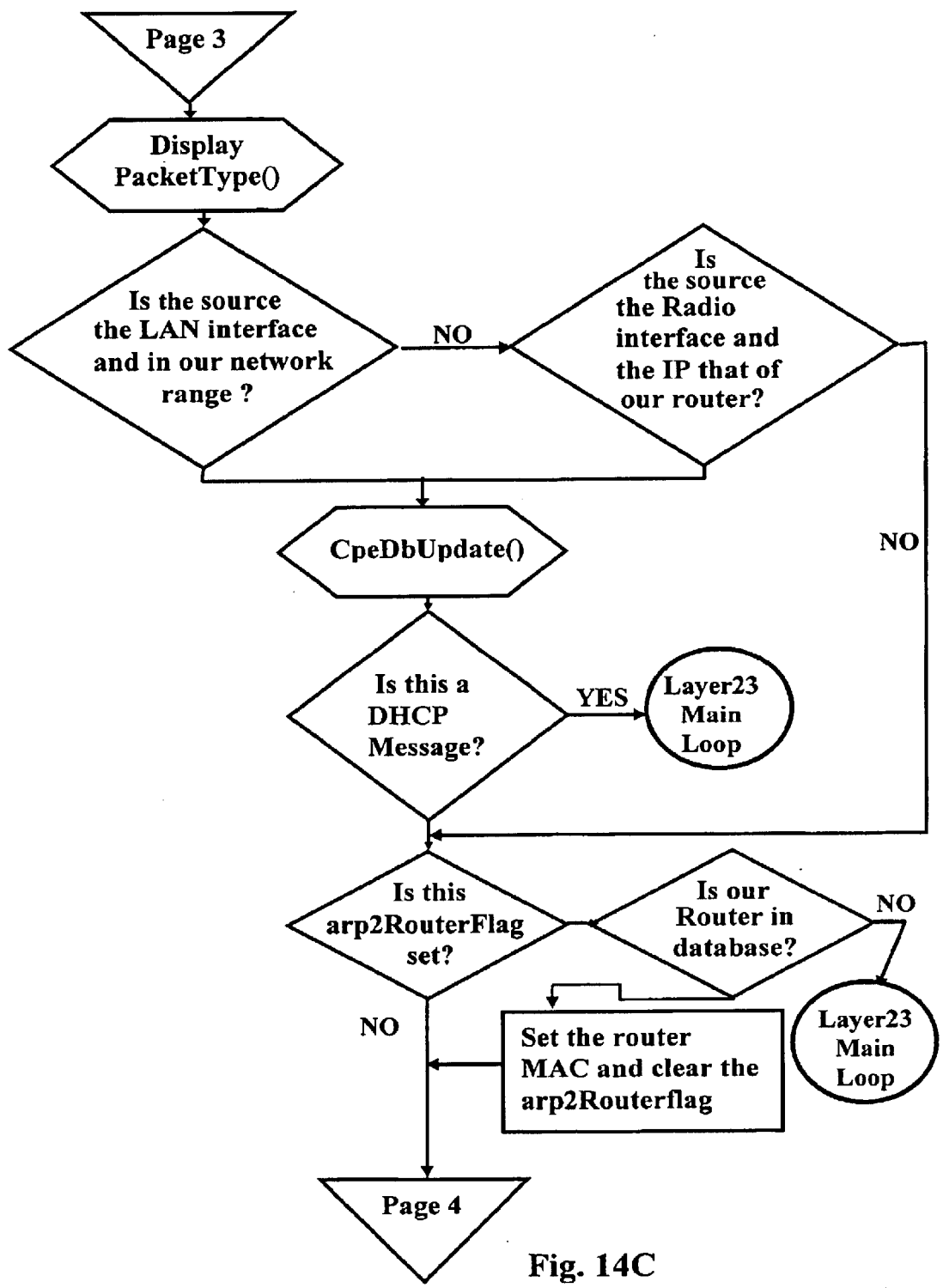
Figure 14D:
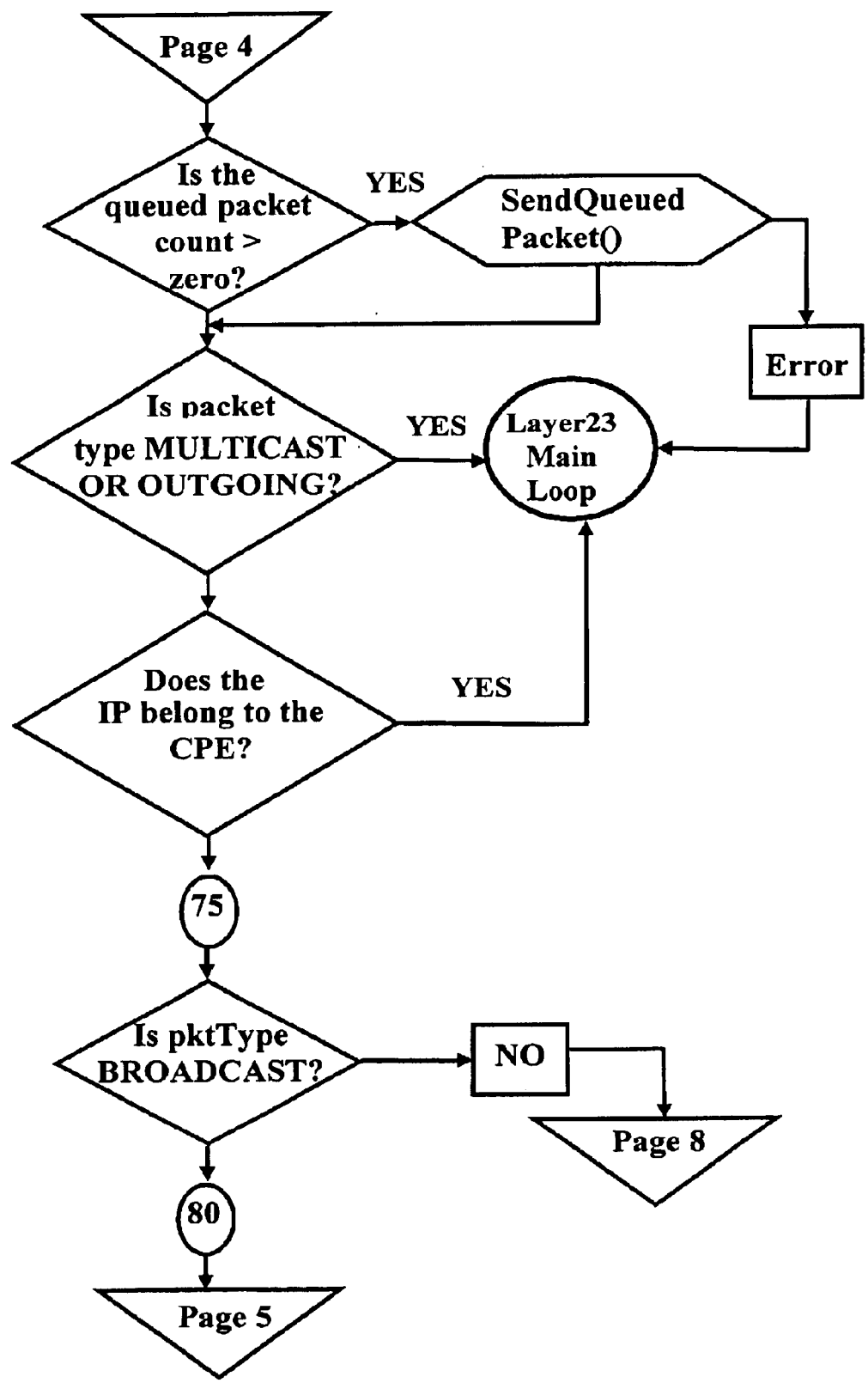
Figure 14E:
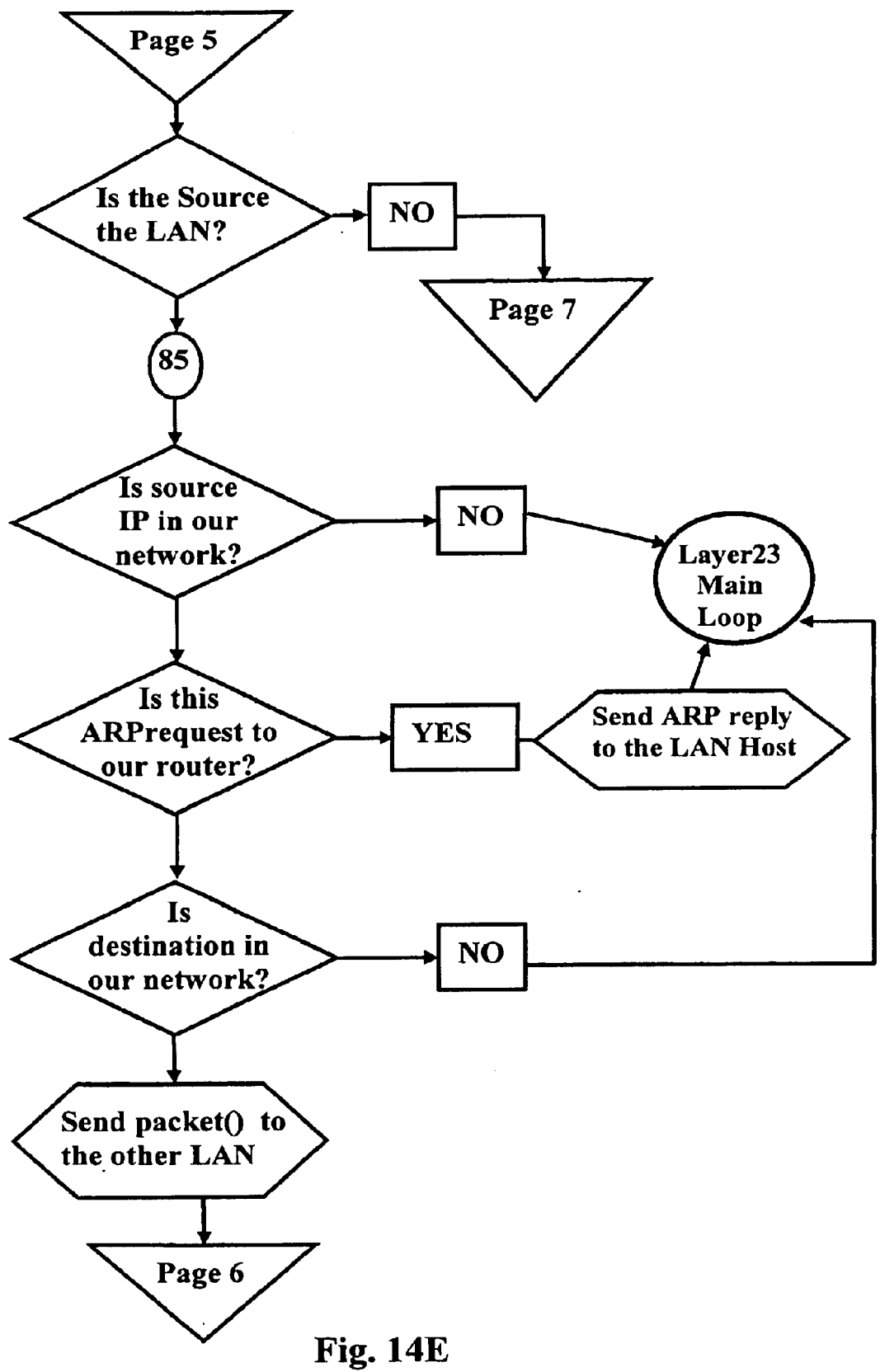
Figure 14F:
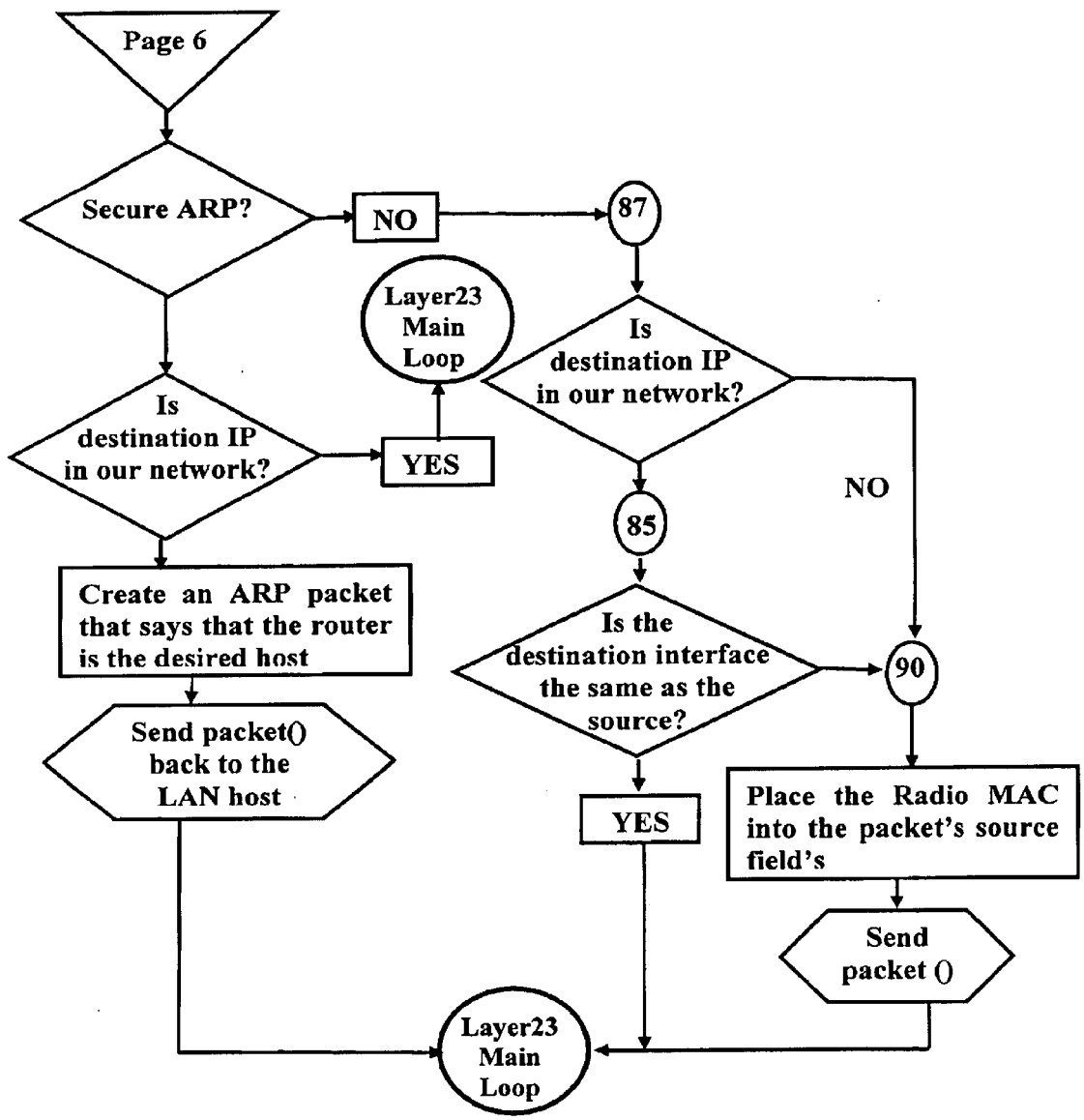
Figure 14G:
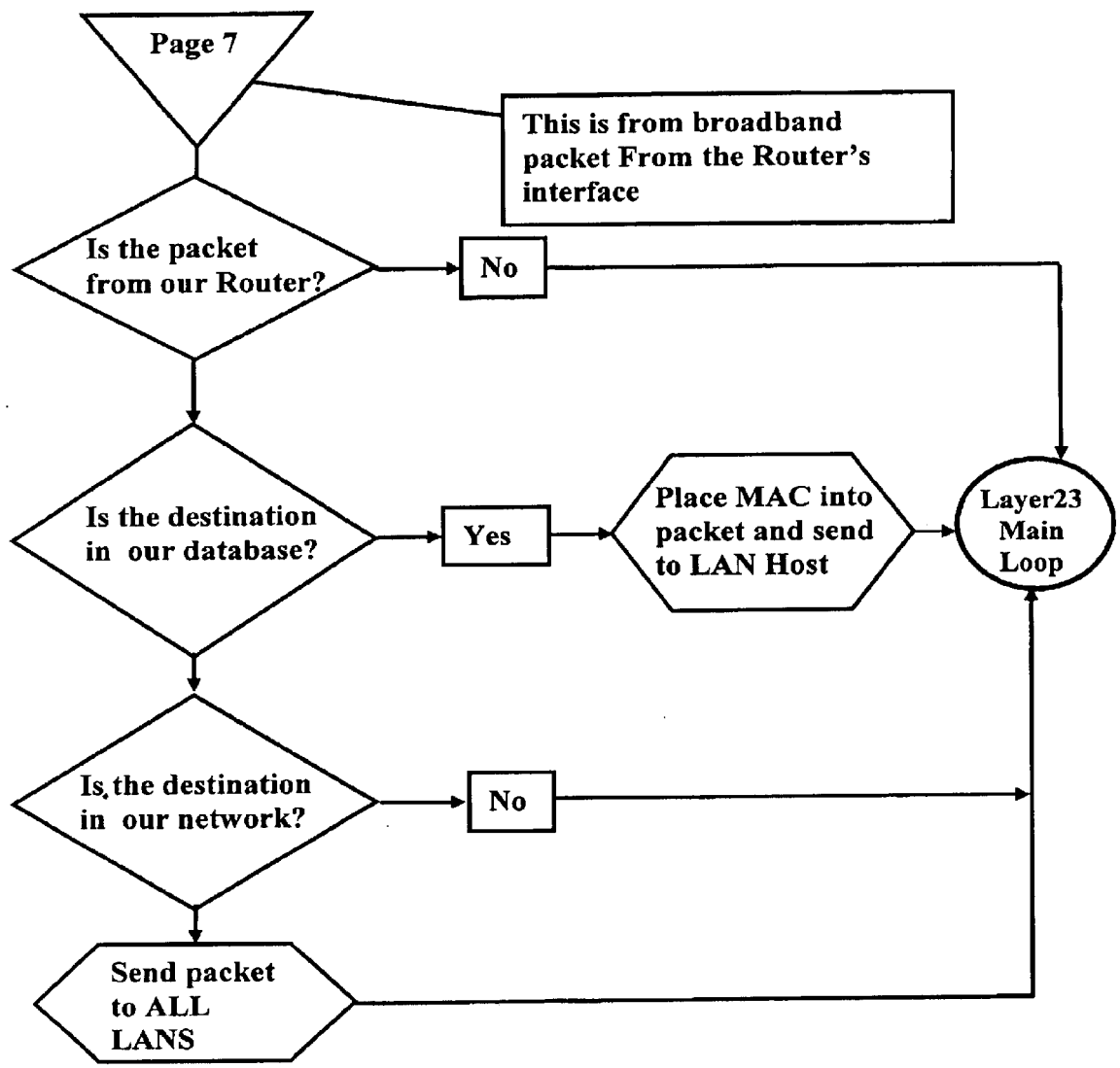
Figure 14H:
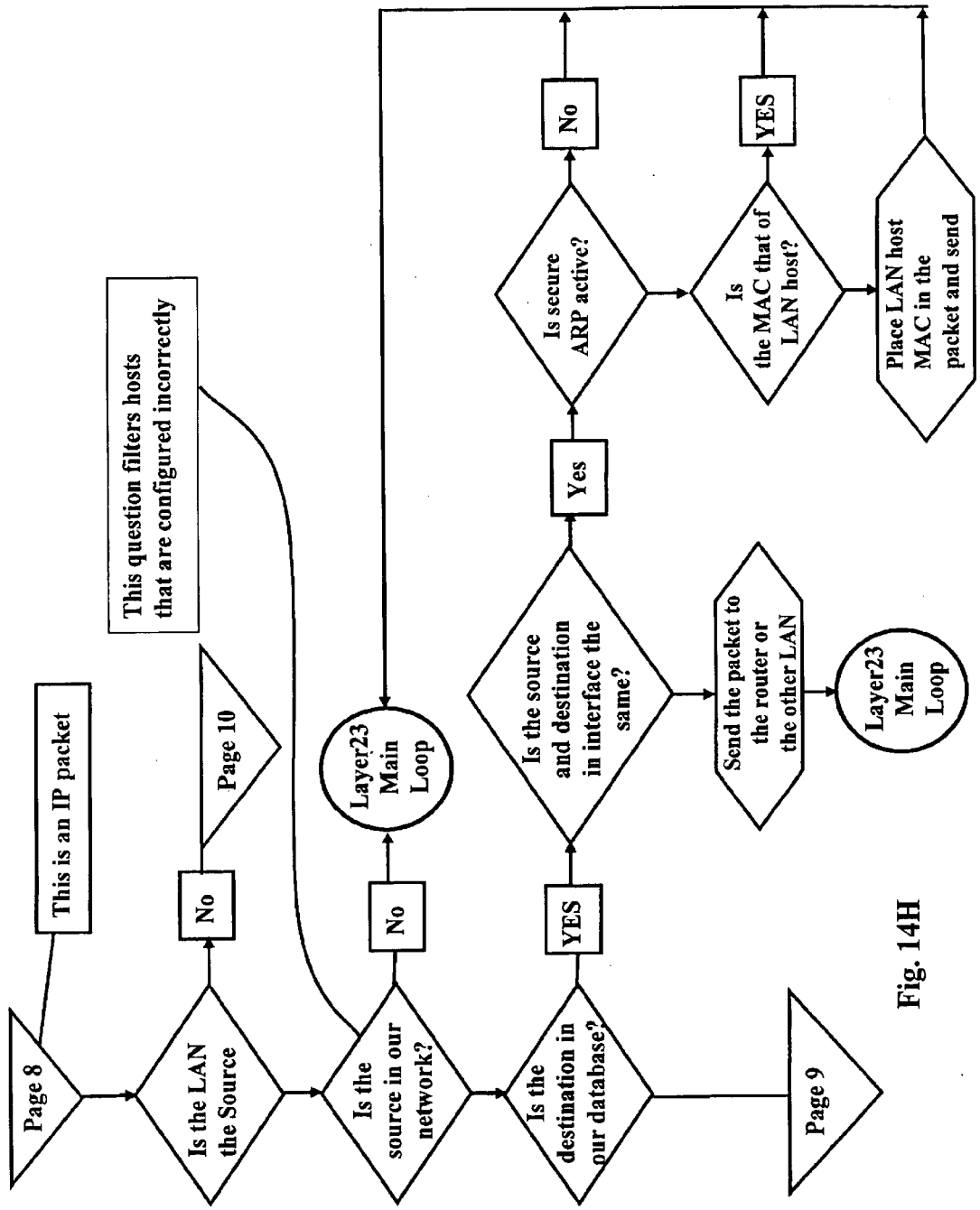
Figure 14I:
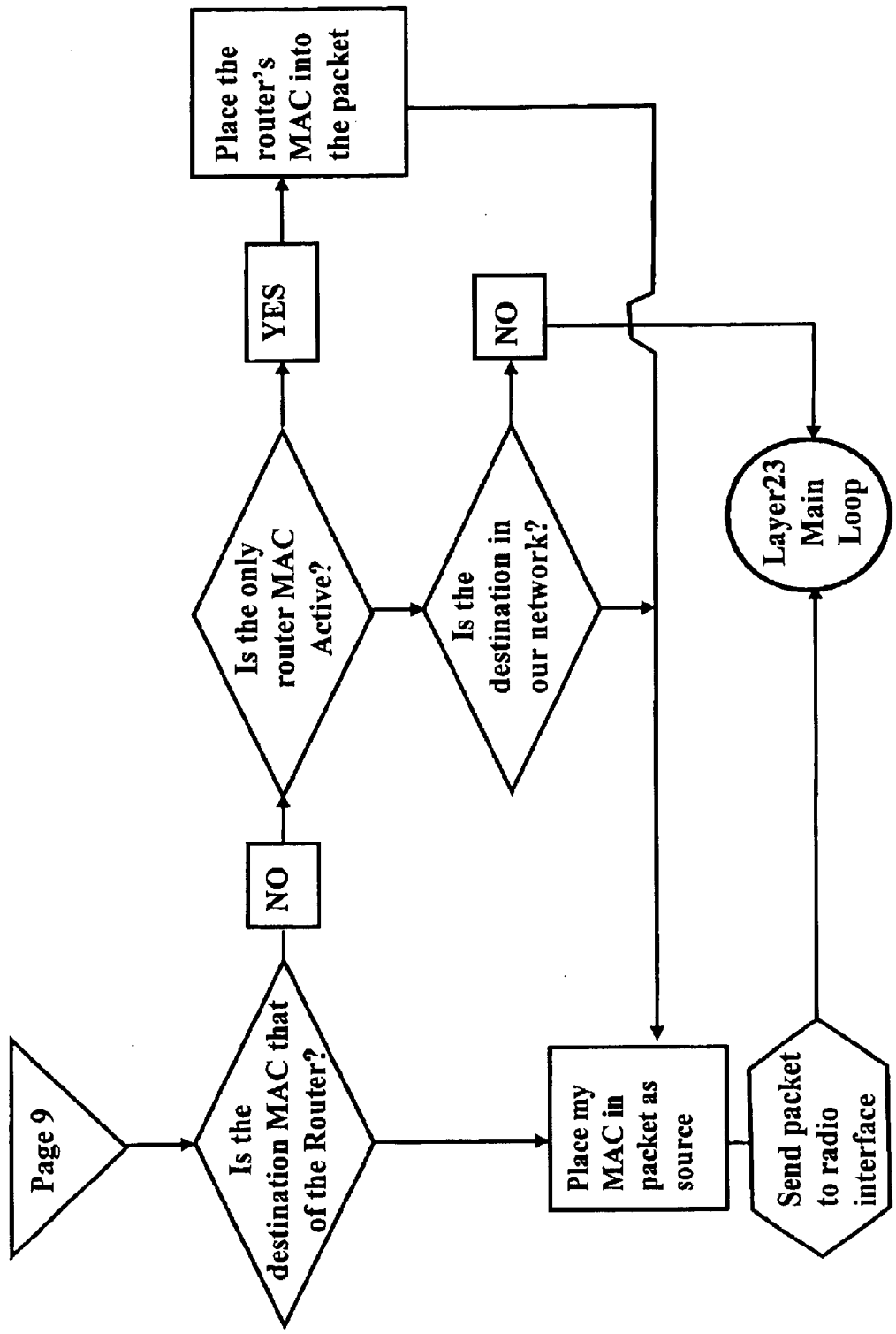
Figure 14J:
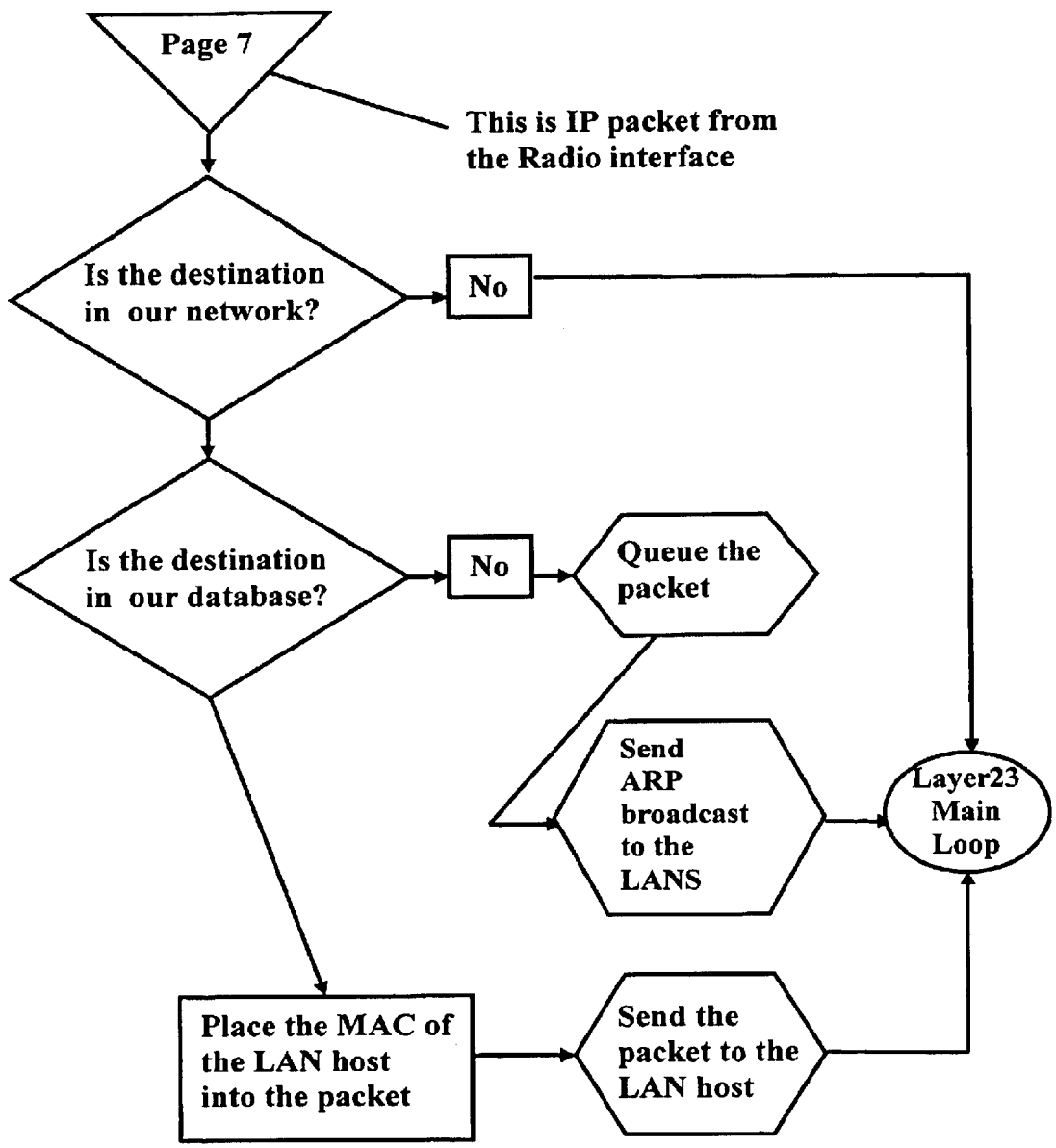

FIG. 13 is a flowchart illustrating a method 1300 by the wireless head end 514 of handling a message from an ISP. Method 1300 begins with the wireless head end 514 in step 1305 receiving a message from the ATM PVC 510 or 512. The wireless head end 514 in step 1310 determines whether the message is of type ARP (e.g., unknown host) or type IP (e.g., normal message). If the message is type ARP, then the wireless head end 514 in step 1315 determines if the MAC address corresponding to the IP address contained in the message is in the ARP table 1105. If the MAC address is identified, then the wireless head end 514 in step 1320 sends a response identifying the host's MAC address back to the inquiring ISP 506 or 508. If an entry is not in either table 1110 or 1105, then the wireless head end 514 in step 1320 forwards a broadcast message to the Ethernet 516.

The case where someone sets up a host 620 and CPE 610 and has not sent any messages to the Internet before someone else attempts to send a message to this host 620 or CPE 610 is unlikely. In addition to the broadcast option described above, other options exist to care for this case. As one alternative option, the wireless head end 514 can wait until the CPE 610 or host 620 sends an outgoing message, can fill in the MAC addresses in the ARP table 1110, and then can forward the incoming messages to the host. As another alternative option, the wireless head end 514 can discard the incoming messages. In some embodiments, an ISP 506 or 508 that cannot find a MAC address sends a broadcast ARP message down all its ATM PVCs 510 or 512. The receiving CPE 610 will apply some filtering of source IP and source MAC address to determine if the message came from its assigned ISP and for an address within the right range, as described in FIGS. 14A–G. The appropriate host receives that message and replies with the appropriate MAC address. It will be appreciated that, in a typical LAN, different IP addresses have different MAC addresses. However, in the present scenario, many IP addresses use the same MAC address.

If the message is type IP, then the wireless head end 514 in step 1330 uses the ATM SIP table 1110 to determine whether the IP address identified in the message comes from the correct ISP 506 or 508. If not, then the wireless head end 514 proceeds to step 1325 to respond to the ISP 506 or 508 that the message is incorrectly addressed. If the IP address corresponds to the ISP 506 or 508, the wireless head end 514 in step 1335 checks the ARP table 1105 for the MAC address. If the IP address is not in the ARP table 1105, the wireless head end 514 in step 1340 sends a broadcast to discover which hosts 620 are on connected and what MAC addresses they have, and adds the entry to the ARP table 1105. Method 1300 then proceeds to step 1320 to forward the message.

FIGS. 14A–G are a flowchart illustrating a method of processing messages by the single board computer of the CPE.

Figure 15:
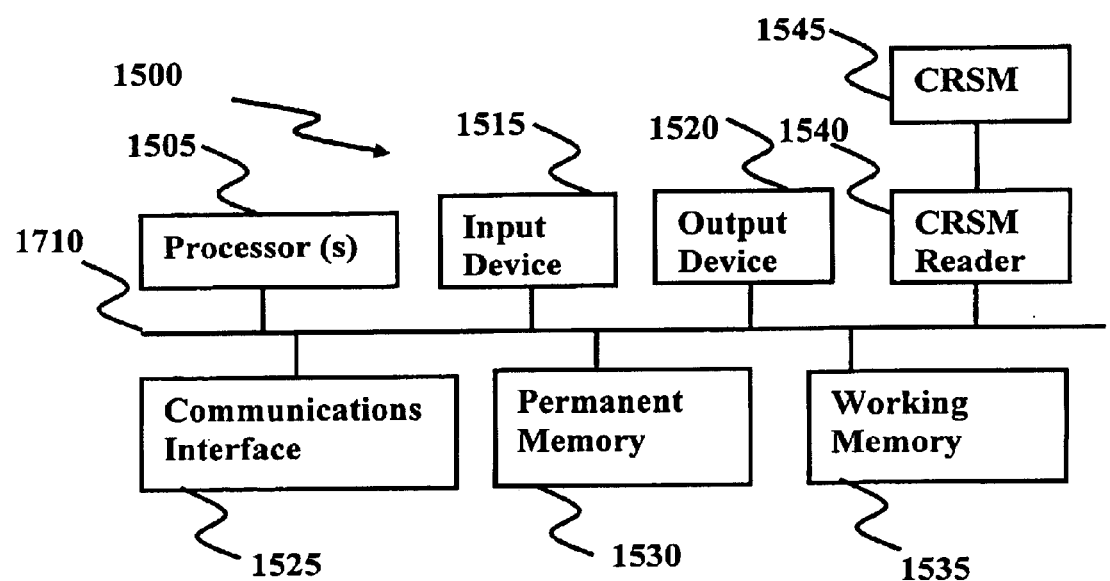
FIG. 15 is a block diagram illustrating a computer system in accordance with a first embodiment of the present invention.

FIG. 15 is a block diagram illustrating an example computer system 1500 that exemplifies details of server 502 and hosts 620. The computer system 1500 includes a processor 1505, such as an Intel Pentium® microprocessor or a Motorola Power PC® microprocessor, coupled to a communications channel 1510. The computer system 1500 further includes an input device 1515 such as a keyboard or mouse, an output device 1520 such as a cathode ray tube display, a communications interface 1525, permanent memory 1530 such as a magnetic disk, and working memory 1535 such as Random-Access Memory (RAM), each coupled to the communications channel 1510. The communications channel 1510 may be coupled to a network such as the wide-area network commonly referred to as the Internet. One skilled in the art will recognize that, although the permanent memory 1530 and working memory 1535 are illustrated as components within a single computer, the permanent memory 1530 and working memory 1535 can be distributed units.

One skilled in the art will recognize that the system 1500 may also include additional information, such as network connections, additional memory, additional processors, LANs, input/output lines for transferring information across a hardware channel, the Internet or an intranet, etc. One skilled in the art will also recognize that the programs and data may be received by and stored in the system in alternative ways. For example, a computer-readable storage medium (CRSM) reader 1540 such as a magnetic disk drive, hard disk drive, magneto-optical reader, CPU, etc. may be coupled to the communications bus 1510 for reading a computer-readable storage medium (CRSM) 1545 such as a magnetic disk, a hard disk, a magneto-optical disk, RAM, etc. Accordingly, the system 1500 may receive programs and data via the CRSM reader 1540. Further, it will be appreciated that the term "memory" herein is intended to cover all data storage media whether temporary or permanent.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. Further, components of this invention may be implemented using a programmed general purpose digital computer, using application specific integrated circuits, or using a network of interconnected conventional components and circuits. All wired connections may be wired, wireless, modem, etc. All wireless connections are preferably wireless. The embodiments described herein are not intended to be exhaustive or limiting. The present invention is limited only by the following claims.

What is claimed is:

1. A wireless head end, comprising:
   an engine for transmitting signals between multiple network service providers and a distribution node, the distribution node for being in wireless communication with subscribers;
   a first interface coupled to the engine for sending signals to and receiving signals from the distribution node, and
   a second interface coupled to the engine for sending signals to and receiving signals from the multiple network service providers, the multiple network service providers being coupled to at least one computer network, wherein the engine:
   maintains both SIP and ARP tables in a memory device;
   receives a signal having a unique network identifier from the distribution node;
   determines if the signal is from a valid subscriber by looking up the unique identifier in the SIP and ARP tables;
   if the signal is from a valid subscriber, determines which network service provider the received signal is addressed to; and
   forwards the signal to the appropriate Network Service Provider.

2. The wireless head end of claim 1, wherein the unique network identifier includes an IP address.

3. The wireless head end of claim 1, wherein the engine:
   records a MAC address in the ARP table for the signal if the unique network identifier is new.

4. A wireless head end comprising:
   an engine for transmitting signals between multiple network service providers and a distribution node, the distribution node for being in wireless communication with subscribers;

a first interface coupled to the engine for sending signals to and receiving signals from the distribution node, and a second interface coupled to the engine for sending signals to and receiving signals from the multiple network service providers, the multiple network service providers being coupled to at least one computer network, wherein the second interface includes an ATM interface, and wherein the engine:

receives a signal from a network service provider;

determines if the network service provider signal is for a known subscriber; and if the signal is not for a known subscriber, broadcasting the network service provider signal to the distribution node.

5. The wireless head end of claim 4, wherein the engine:

determines if the network service provider signal is incorrectly addressed;

if the network service provider signal is incorrectly addressed, notifying the network service provider that the network service provider signal is incorrectly addressed; and if the network service provider signal is correctly addressed, forwarding the network service provider signal to the distribution node.

6. A computer-readable medium storing instructions for causing a wireless head end to perform the steps of:

maintaining both SIP and ARP tables in a memory device;

receiving a signal having a unique network identifier from a distribution node;

determining if the signal is from a valid subscriber by looking up the unique identifier in the SIP and ARP tables;

if the signal is from a valid subscriber, determining which Network Service Provider the received signal is addressed to; and forwarding the signal to the appropriate Network Service Provider.

7. The computer-readable medium of claim 6, wherein the unique network identifier includes an IP address.

8. The computer-readable medium of claim 6 further comprising an instruction to cause the wireless head end to record a MAC address in the ARP table for the received signal if the received signal's unique network identifier is new.

9. The computer-readable medium of claim 6 further comprising instructions to cause the wireless head end to perform the steps of:

receiving a signal from a network service provider;

determining if the network service provider signal is for a known subscriber; and if the network service provider signal is not for a known subscriber, broadcasting the network service provider signal to a distribution node.

10. The computer-readable medium of claim 9 further comprising instructions to cause the wireless head end to perform the steps of:

determining if the network service provider signal is incorrectly addressed;

if the network service provider signal is incorrectly addressed, notifying the network service provider that the network service provider signal is incorrectly addressed; and if the network service provider signal is correctly addressed, forwarding the network service provider signal to the distribution node.

11. A wireless head end, comprising:

maintaining means for maintaining SIP and ARP tables in a memory device;

first receiving means for receiving a signal having a unique network identifier from a distribution node;

first determining means for determining if the signal is from a valid subscriber by looking up the unique identifier in the SIP and ARP tables;

second determining means for determining which Network Service Provider the received signal is addressed to if the signal is from a valid subscriber; and forwarding means for forwarding the signal to the appropriate Network Service Provider.

12. The wireless head end of claim 11, further comprising:

second receiving means for receiving a signal from a network service provider;

third determining means for determining if the network service provider signal is for a known subscriber; and broadcasting means for broadcasting the network service provider signal to a distribution node if the signal is not for a known subscriber.

13. A method performed by a head end, the method comprising:

maintaining both SIP and ARP tables in a memory device;

receiving a signal having a unique network identifier from a distribution node;

determining if the signal is from a valid subscriber by looking up the unique identifier in the SIP and ARP tables;

if the signal is from a valid subscriber, determining which Network Service Provider the received signal is addressed to; and forwarding the signal to the appropriate Network Service Provider.

14. The method of claim 13, wherein the unique network identifier includes an IP address.

15. The method of claim 13, further comprising a step to cause the wireless head end to record a MAC address in the ARP table for the received signal if the received signal's unique network identifier is new.

16. The method of claim 13, further comprising the steps of:

receiving a signal from a network service provider;

determining if the network service provider signal is for a known subscriber; and if the network service provider signal is not for a known subscriber, broadcasting the network service provider signal to a distribution node.

17. The method of claim 16, further comprising the steps of:

determining if the network service provider signal is incorrectly addressed;

if the network service provider signal is incorrectly addressed, notifying the network service provider that the network service provider signal is incorrectly addressed; and if the network service provider signal is correctly addressed, forwarding the network service provider signal to the distribution node.

* * * * *